(12) United States Patent
Eguchi et al.

(10) Patent No.: US 8,302,525 B2
(45) Date of Patent: Nov. 6, 2012

(54) HYDRAULIC STEPLESS TRANSMISSION

(75) Inventors: Shingo Eguchi, Osaka (JP); Takeshi Ouchida, Osaka (JP); Shuji Shiozaki, Osaka (JP)

(73) Assignee: Yanmar Co., Ltd., Osaka (JP)

( * ) Notice: Subject to any disclaimer, the term of this patent is extended or adjusted under 35 U.S.C. 154(b) by 948 days.

(21) Appl. No.: 12/304,232

(22) PCT Filed: Nov. 21, 2006

(86) PCT No.: PCT/JP2006/323180
§ 371 (c)(1),
(2), (4) Date: Feb. 3, 2009

(87) PCT Pub. No.: WO2007/144975
PCT Pub. Date: Dec. 21, 2007

(65) Prior Publication Data
US 2009/0199554 A1    Aug. 13, 2009

(30) Foreign Application Priority Data

Jun. 12, 2006   (JP) .................. 2006-162751
Jun. 12, 2006   (JP) .................. 2006-162752
Jun. 12, 2006   (JP) .................. 2006-162755

(51) Int. Cl.
*F04B 1/20*      (2006.01)
*F15B 13/16*   (2006.01)
(52) U.S. Cl. ................ 92/13; 91/506; 60/492
(58) Field of Classification Search .......... 92/12.2, 92/13; 60/487, 492; 91/505, 506
See application file for complete search history.

(56) References Cited

U.S. PATENT DOCUMENTS

| | | | | |
|---|---|---|---|---|
| 3,139,006 A | * | 6/1964 | Budzich | 91/506 |
| 3,618,472 A | * | 11/1971 | Knaak | 91/506 |
| 3,817,150 A | | 6/1974 | Cox | |
| 3,988,893 A | | 11/1976 | Bojas et al. | |
| 5,226,349 A | | 7/1993 | Alme et al. | |
| 7,305,822 B2 | * | 12/2007 | Ouchida et al. | 60/489 |
| 2006/0174617 A1 | | 8/2006 | Ouchida et al. | |

FOREIGN PATENT DOCUMENTS
EP          0 922 858 A2    6/1999
(Continued)

OTHER PUBLICATIONS

International Search Report for PCT/JP2006/323180, the Japanese Patent Office, mailed Feb. 20, 2007, 4 pgs.
European Search Report for 06833030.7 (European National Phase of PCT/JP2006/323180), the European Patent Office, mailed Dec. 15, 2010, 7 pages.

(Continued)

*Primary Examiner* — Thomas E Lazo
(74) *Attorney, Agent, or Firm* — Sterne, Kessler, Goldstein & Fox P.L.L.C.

(57) ABSTRACT

A hydraulic stepless transmission having increased layout freedom and a compact structure with the functions of conventional hydraulic stepless transmission retained and having increased easiness of production. In the hydraulic stepless transmission, the movable swash plate (input side swash plate) of a variable displacement plunger hydraulic pump or motor is tilted by a hydraulic servo mechanism. The hydraulic servo mechanism has a power piston connected to one end of the input side swash plate for tilting the swash plate, a servo spool (13) placed normal to the direction of sliding of the power piston and substantially parallel to the input side swash plate, and a feedback link for connecting the servo spool and the input side swash plate.

11 Claims, 25 Drawing Sheets

FOREIGN PATENT DOCUMENTS

| | | |
|---|---|---|
| JP | 63-030650 A | 2/1988 |
| JP | 5-296343 A | 11/1993 |
| JP | 11-351134 | 12/1999 |
| JP | 2005-083497 | 3/2005 |
| JP | 2005-083498 A | 3/2005 |

OTHER PUBLICATIONS

English translation of Notification of Reasons for Refusal issued in connection with JP Application No. 2006-162751, Japanese Patent Office, mailed Sep. 6, 2011, 2 pages.

* cited by examiner

A-A sectional view

B-B sectional view

HYDRAULIC STEPLESS TRANSMISSION

TECHNICAL FIELD

The present invention relates to a hydraulic stepless transmission which is widely adoptable to a vehicle such as a motorcar or agricultural working vehicle.

BACKGROUND ART

Conventionally, there is well known an art of a hydraulic stepless transmission (HST) comprising first and second rotation shafts, first and second plungers reciprocated along the axis, first and second spools reciprocated along the axis, a cylinder block housing the first and second plungers and the first and second spools and rotated integrally with the first rotation shaft, a movable swash plate touching the first plunger at its swash plate surface whose slant angle about the axis is variable, and a fixed swash plate rotated integrally with the second rotation shaft while touching the second plunger at its swash plate surface whose slant angle about the axis is fixed characterized in that the slant angle of the movable swash plate about the axis is variable.

With regard to the hydraulic stepless transmission, a hydraulic servo mechanism is used as a driving mechanism regulating slant angle of the movable swash plate of a hydraulic pump or a hydraulic motor of variable capacity type.

The hydraulic servo mechanism makes large driving power from small operating power and regulates operating amount easily and accurately, thereby leading to wide use as a driving regulation means of a movable part of an apparatus.

The hydraulic servo mechanism conventionally adopted to the hydraulic stepless transmission is a double barrel type hydraulic servo mechanism generally comprising a piston slid into a cylinder so as to generate large driving power as an actual output and a servo spool built in the piston as an operation body for position control. The double barrel type hydraulic servo mechanism is excessively large against driving power generated thereby so as to reduce degree of freedom of layout.

With regard to the known art, in the case of using the hydraulic servo mechanism as a driving mechanism of the movable swash plate of the hydraulic stepless transmission, the hydraulic servo mechanism is separated from the hydraulic stepless transmission and is disposed separately in the vicinity of the hydraulic stepless transmission, and driving power is transmitted through a link mechanism. Then, the additional attachment space is required.

According to the above conditions, it is difficult to construct a hydraulic stepless transmission compactly.

With regard to the conventional art, a cylinder block adopted to the hydraulic stepless transmission is manufactured by forming a plurality of holes in a cylindrical steel material by mechanical processing and requires troublesome processes such as boring so that number of processes is many. Then, it is difficult to make the manufacturing easy.

The mechanical processing is required for details of the cylinder block so it is difficult to miniaturize the cylinder block, whereby it is also difficult to miniaturize the hydraulic stepless transmission.

Conventionally, each of the first and second spools is always slid reciprocally with fixed timing at the time of operation of the transmission so as to switch oil passages. If the timing is not uniform, the hydraulic stepless transmission is not actuated normally. Then, the timing must be uniform.

An art is required for reducing frictional resistance of sliding of the spools as much as possible so as to make the sliding of the spools smooth and to prevent any trouble such as seizing.

DISCLOSURE OF INVENTION

Problems to be Solved by the Invention

The purpose of the present invention is to provide an art so that the degree of freedom of layout is improved so as to make the construction compact and improving manufacturing ability while securing functions of the conventional hydraulic stepless transmission, and to make the timing of sliding of each spool uniform to improve the reliability of each spool so as to improve the reliability of the hydraulic stepless transmission.

Means for Solving the Problems

With regard to the hydraulic stepless transmission according to the present invention, a hydraulic apparatus constructed so that a movable swash plate of a hydraulic pump or a hydraulic motor of plunger type and variable capacity type is slanted by a hydraulic servo mechanism and is characterized in that the hydraulic servo mechanism comprises a slanting piston connected to one of ends of the movable swash plate which slantingly drives the movable swash plate, a servo spool arranged perpendicularly to slide direction of the slanting piston and substantially in parallel to the movable swash plate, and a feedback link connecting the servo spool to the movable swash plate.

With regard to the hydraulic stepless transmission according to the present invention, the hydraulic servo mechanism is constructed so that the slanting piston and the servo spool are housed in a same casing.

With regard to the hydraulic stepless transmission according to the present invention, the hydraulic servo mechanism is constructed so that the feedback link is substantially parallel to the slanting piston, and one of ends of the feedback link is pivotally connected to the movable swash plate, a middle portion of the feedback link is pivotally connected to the servo spool, and the other end of the feedback link is pivotally connected to the casing.

With regard to the hydraulic stepless transmission according to the present invention, a pivot connection part of the feedback link and the movable swash plate and a pivot connection part of the feedback link and the servo spool are arranged so that distance between a fulcrum of the feedback link and a rotation center of the movable swash plate is extended as much as possible, distance between the pivot connection part of the feedback link and the movable swash plate and the rotation center of the movable swash plate is extended as much as possible, and distance between the fulcrum of the feedback link and the pivot connection part of the feedback link and the servo spool is extended as much as possible.

With regard to the hydraulic stepless transmission according to the present invention, the slanting piston is offset to a side touched by a plunger with high pressure from a surface passing through a rotation axis of a cylinder block housing the plunger and is perpendicular to a rotation axis of the movable swash plate.

With regard to the hydraulic stepless transmission according to the present invention, the slanting piston is constructed by a cylinder rod.

With regard to the hydraulic stepless transmission according to the present invention, when the slanting piston is slid to be extended, the movable swash plate is rotated so that the hydraulic apparatus is actuated at an acceleration side, and when the slanting piston is slid to be contracted, the movable swash plate is rotated so that the hydraulic apparatus is actuated at a deceleration side.

With regard to the hydraulic stepless transmission according to the present invention, a hydraulic apparatus is constructed so that plungers for a hydraulic pump, plungers for a hydraulic motor, a cylinder block housing timing spools slidably along an axis, a movable swash plate touching a tip of the plungers for the hydraulic pump, and a fixed swash plate arranged opposite from the movable swash plate and touching the plungers for a hydraulic motor are arranged on an input shaft and is characterized in that a plurality of holes respectively housing the plungers for the hydraulic pump and the hydraulic motor are arranged alternately on a same radius of the cylinder block and holes housing the timing spools are arranged between the holes for the plungers for the hydraulic pump and the holes for the plungers for the hydraulic motor at a side of a center.

With regard to the hydraulic stepless transmission according to the present invention, the cylinder block is constructed so that the holes for the plungers for the hydraulic pump, the holes for the plungers for the hydraulic motor, the holes housing the timing spools, and an oil passage connected to the plunger holes are formed by casting with a core.

With regard to the hydraulic stepless transmission according to the present invention, a hydraulic apparatus is constructed so that a cylinder block housing plungers for a hydraulic pump, plungers for a hydraulic motor and timing spools parallel to an axis slidably, a movable swash plate touching a tip of the plungers for the hydraulic pump, and a fixed swash plate arranged opposite from the movable swash plate and touching the plungers for a hydraulic motor are arranged on an input shaft and is characterized in that a groove engaged with ends of the timing spools are provided in a cylindrical cam fixed to a main body or the fixed swash plate, and a touching part of the groove and an engagement part provided at a tip of each of the timing spools is arcuate when viewed in cross-section.

With regard to the hydraulic stepless transmission according to the present invention, the engagement part provided at the tip of each of the timing spools is constructed substantially linearly and rectangularly when viewed in cross-section.

With regard to the hydraulic stepless transmission according to the present invention, width across flat projections are formed on inner surfaces of a pivoted part of the fixed swash plate, width across flat recesses are formed in outer surfaces of a pivoted part of the cylindrical cam, and the projections are engaged with recesses so that the fixed swash plate is fixed to the cylindrical cam so as not to be rotatable relatively.

With regard to the hydraulic stepless transmission according to the present invention, a third projection different from the width across flat projections is formed on the inner surface of the pivoted part of the fixed swash plate, a third recesses different from the width across flat recesses is formed in the outer surfaces of the pivoted parts of the cylindrical cam, and the third projection is engaged with the third recess so that the fixed swash plate is fixed to the cylindrical cam so as not to be rotatable relatively.

Effect of the Invention

With regard to the hydraulic stepless transmission according to the present invention, a hydraulic apparatus is constructed so that a movable swash plate of a hydraulic pump or a hydraulic motor of plunger type and variable capacity type is slanted by a hydraulic servo mechanism and is characterized in that the hydraulic servo mechanism comprises a slanting piston connected to one of ends of the movable swash plate which slantingly drives the movable swash plate, a servo spool arranged perpendicularly to slide direction of the slanting piston and substantially parallel to the movable swash plate, and a feedback link connecting the servo spool to the movable swash plate. Accordingly, the hydraulic apparatus is miniaturized. The attachment work of the hydraulic apparatus can be performed easily. The feedback mechanism is simplified.

With regard to the hydraulic stepless transmission according to the present invention, the hydraulic servo mechanism is constructed so that the slanting piston and the servo spool are housed in a same casing. Accordingly, the hydraulic apparatus is miniaturized.

With regard to the hydraulic stepless transmission according to the present invention, the hydraulic servo mechanism is constructed so that the feedback link is substantially in parallel to the slanting piston, and one of ends of the feedback link is pivotally connected to the movable swash plate, a middle portion of the feedback link is pivotally connected to the servo spool, and the other end of the feedback link is pivotally connected to the casing. Accordingly, the accurate feedback mechanism with easy construction is constructed.

With regard to the hydraulic stepless transmission according to the present invention, a pivot connection part of the feedback link and the movable swash plate and a pivot connection part of the feedback link and the servo spool are arranged so that distance between a fulcrum of the feedback link and a rotation center of the movable swash plate is extended as much as possible, distance between the pivot connection part of the feedback link and the movable swash plate and the rotation center of the movable swash plate is extended as much as possible, and distance between the fulcrum of the feedback link and the pivot connection part of the feedback link and the servo spool is extended as much as possible. Accordingly, the resolution of the hydraulic servo mechanism is improved.

With regard to the hydraulic stepless transmission according to the present invention, the slanting piston is offset to a side touched by a plunger with high pressure from a surface passing through a rotation axis of a cylinder block housing the plunger and is perpendicular to a rotation axis of the movable swash plate. Accordingly, unsuitable stress is prevented from being applied to the movable swash plate, and the movable swash plate is rotated smoothly.

With regard to the hydraulic stepless transmission according to the present invention, the slanting piston is constructed by a cylinder rod. Accordingly, the hydraulic apparatus is miniaturized.

With regard to the hydraulic stepless transmission according to the present invention, when the slanting piston is slid to be extended, the movable swash plate is rotated so that the hydraulic apparatus is actuated at an acceleration side, and when the slanting piston is slid to be contracted, the movable swash plate is rotated so that the hydraulic apparatus is actuated at a deceleration side. Accordingly, the diameter of the piston and the hydraulic supply pressure may be reduced.

With regard to the hydraulic stepless transmission according to the present invention, a hydraulic apparatus is constructed so that plungers for a hydraulic pump, plungers for a hydraulic motor, a cylinder block housing timing spools slidably along an axis, a movable swash plate touching a tip of the plungers for the hydraulic pump, and a fixed swash plate arranged opposite from the movable swash plate and touching the plungers for a hydraulic motor are arranged on an input shaft and is characterized in that a plurality of holes respectively housing the plungers for the hydraulic pump and the hydraulic motor are arranged alternately on a same radius of the cylinder block, and holes housing the timing spools are arranged between the holes for the plungers for the hydraulic pump and the holes for the plungers for the hydraulic motor at a side of a center. Accordingly, the cylinder block is miniaturized while the distance between the holes housing the plungers and the holes housing the spools is secured.

In the case that the outside dimension of the cylinder block is not changed, the caliber of each of the holes housing the plungers and the holes housing the spools can be increased so as to make the processing of the holes easy.

With regard to the hydraulic stepless transmission according to the present invention, the cylinder block is constructed so that the holes for the plungers for the hydraulic pump, the holes for the plungers for the hydraulic motor, the holes housing the timing spools, and an oil passage connected to the plunger holes are formed by casting with a core. Accordingly, the boring process or the like is omitted, and a plug required for closing the end of the bored hole is omitted so as to reduce the number of parts, whereby the cost of the cylinder block is reduced.

The rib required for processing the plug of the end of the bored hole is omitted so as to reduce the size and weight of the cylinder block.

With regard to the hydraulic stepless transmission according to the present invention, a hydraulic apparatus is constructed so that a cylinder block housing plungers for a hydraulic pump, plungers for a hydraulic motor and timing spools in parallel to an axis slidably, a movable swash plate touching a tip of the plungers for the hydraulic pump, and a fixed swash plate arranged opposite from the movable swash plate and touching the plungers for a hydraulic motor are arranged on an input shaft and is characterized in that a groove engaged with ends of the timing spools is provided in a cylindrical cam fixed to a main body or the fixed swash plate, and a touching part of the groove and an engagement part provided at a tip of each of the timing spools is arcuate when viewed in cross-section. Accordingly, the timing spools are prevented from seizing, and the timing spools slide smoothly.

With regard to the hydraulic stepless transmission according to the present invention, the engagement part provided at the tip of each of the timing spools is constructed substantially linearly and rectangularly when viewed in cross-section. Accordingly, the timing spools are processed easily, and the timing spools slide smoothly.

With regard to the hydraulic stepless transmission according to the present invention, width across flat projections are formed on inner surfaces of a pivoted part of the fixed swash plate, width across flat recesses are formed in outer surfaces of a pivoted part of the cylindrical cam, and the projections are engaged with recesses so that the fixed swash plate is fixed to the cylindrical cam so as not to be rotatable relatively. Accordingly, the phase of each of the timing spools is certainly in agreement with each other, whereby the timing of switching the oil passage is secured certainly. The assembly work is made easy.

With regard to the hydraulic stepless transmission according to the present invention, a third projection different from the width across flat projections is formed on the inner surface of the pivoted part of the fixed swash plate, a third recess different from the width across flat recesses is formed in the outer surfaces of the pivoted parts of the cylindrical cam, and the third projection is engaged with the third recess so that the fixed swash plate is fixed to the cylindrical cam so as not to be rotatable relatively. Accordingly, error of assembly of the hydraulic apparatus is prevented, and the assembly work is made easy.

THE BEST MODE FOR CARRYING OUT THE INVENTION

Next, explanation will be given on the embodiment of the present invention.

Figure 1:
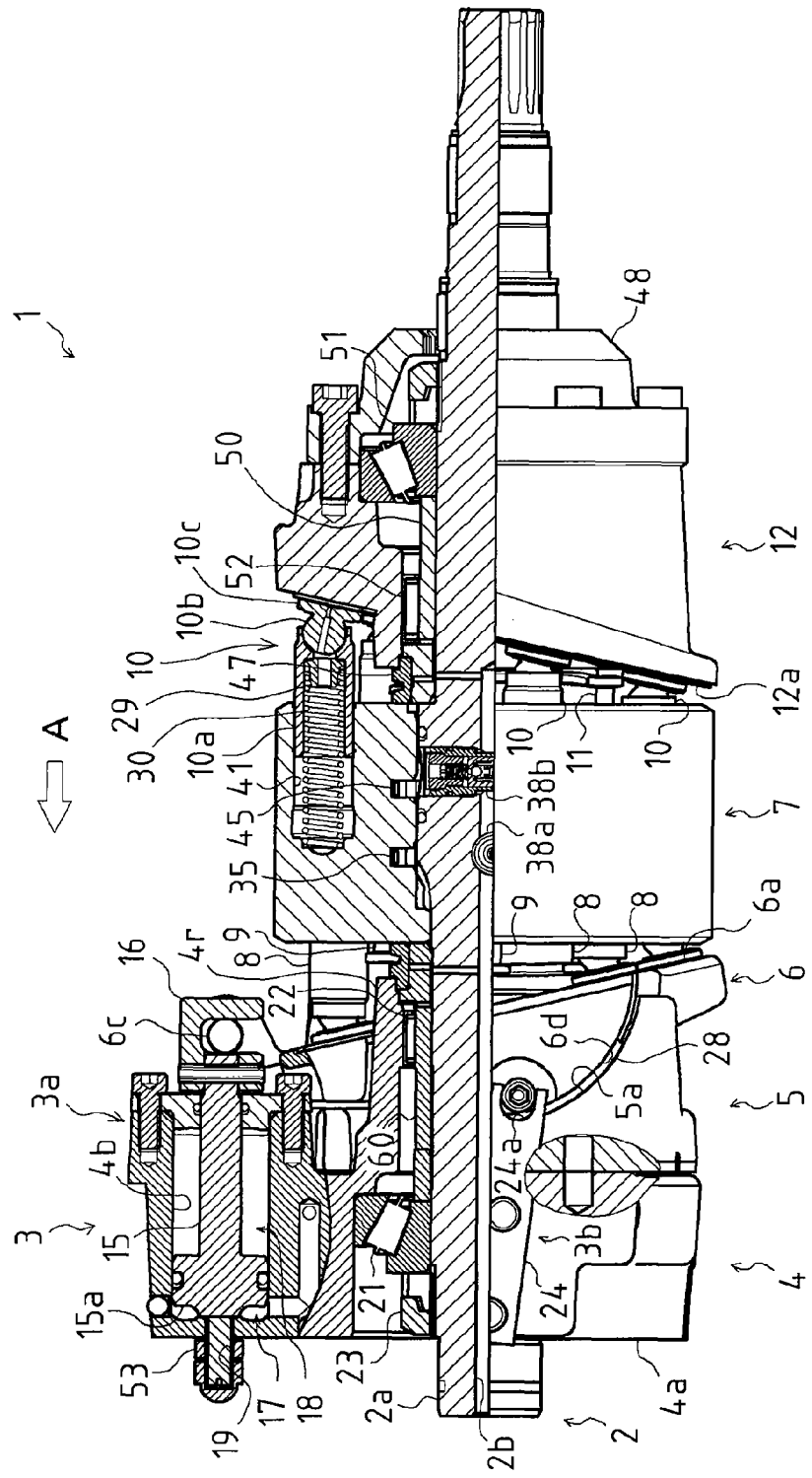
FIG. 1 is a side view, partially in cross-section, of entire construction of a hydraulic stepless transmission according to an embodiment of the present invention.
Figure 2:
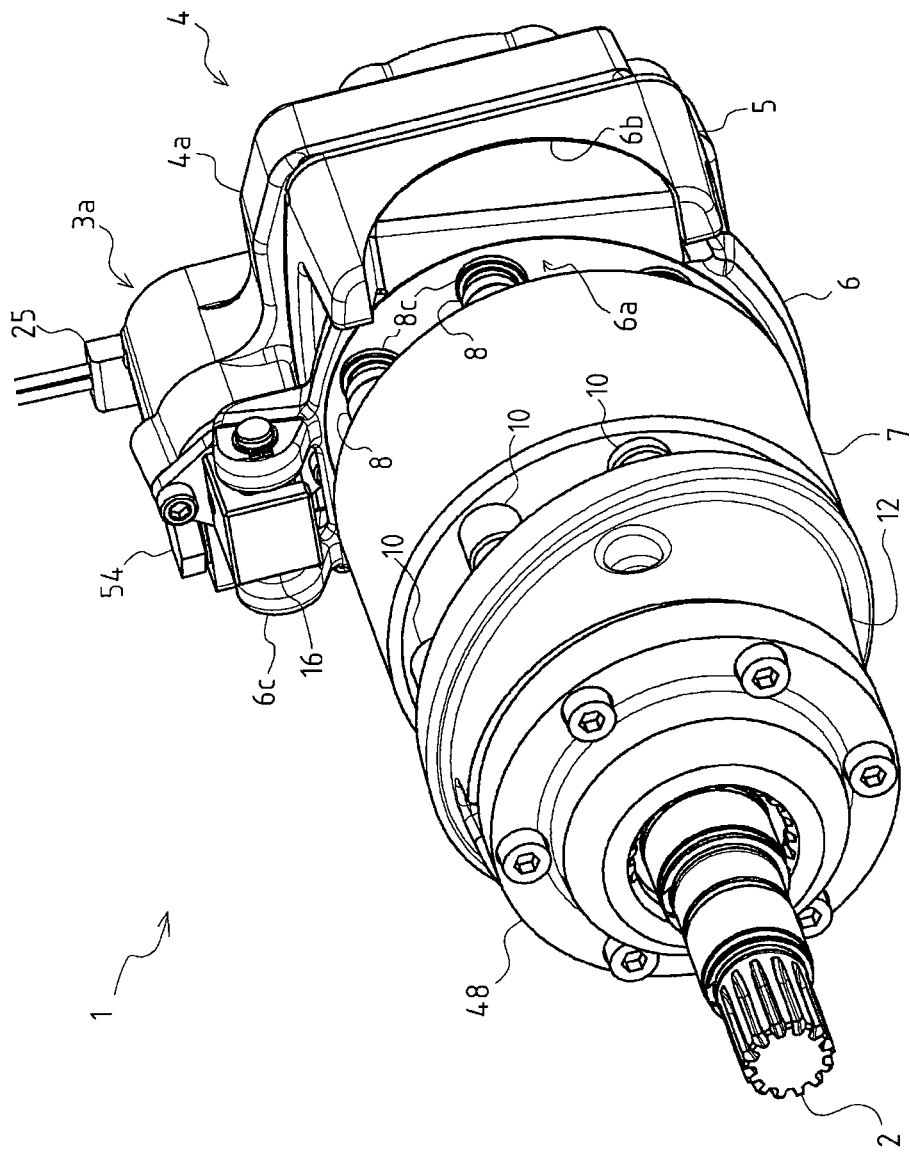
FIG. 2 is a perspective view of the entire construction of the hydraulic stepless transmission.
Figure 3:
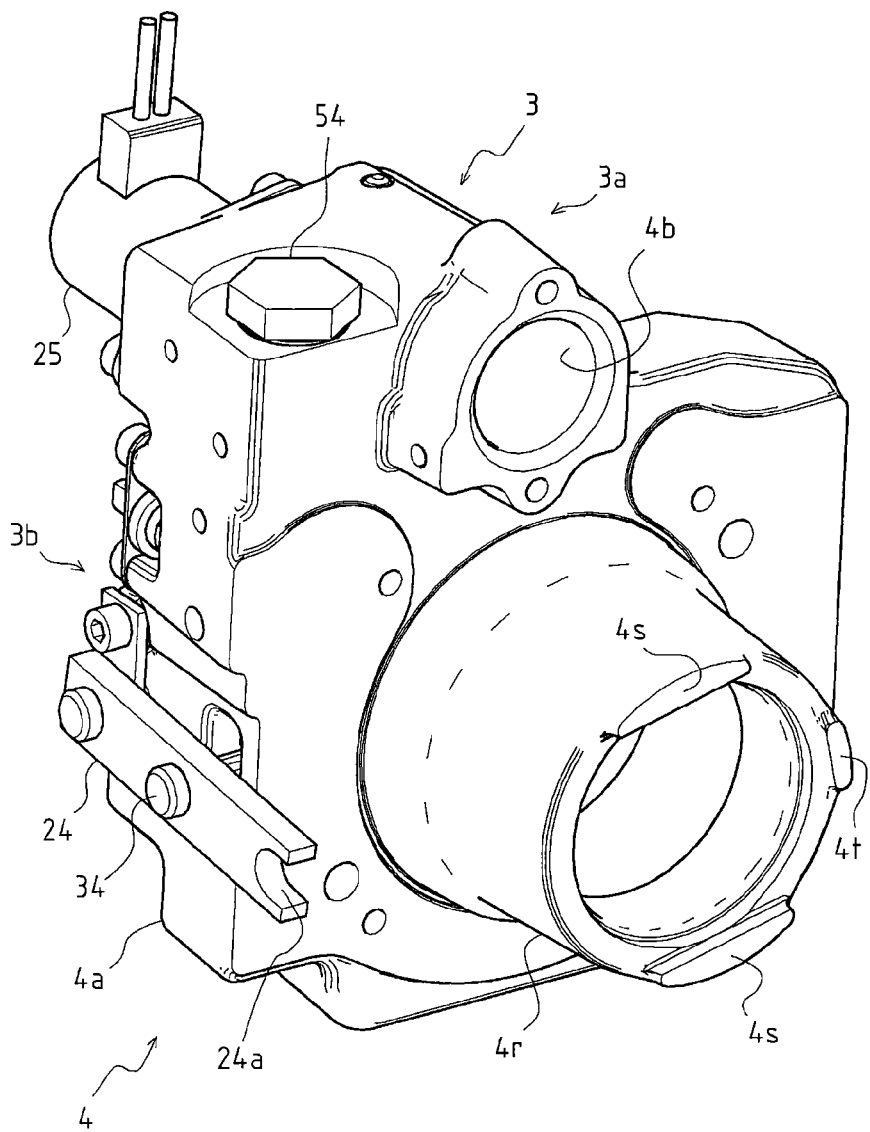
FIG. 3 is a perspective view of entire construction of an input side housing.
Figure 4:
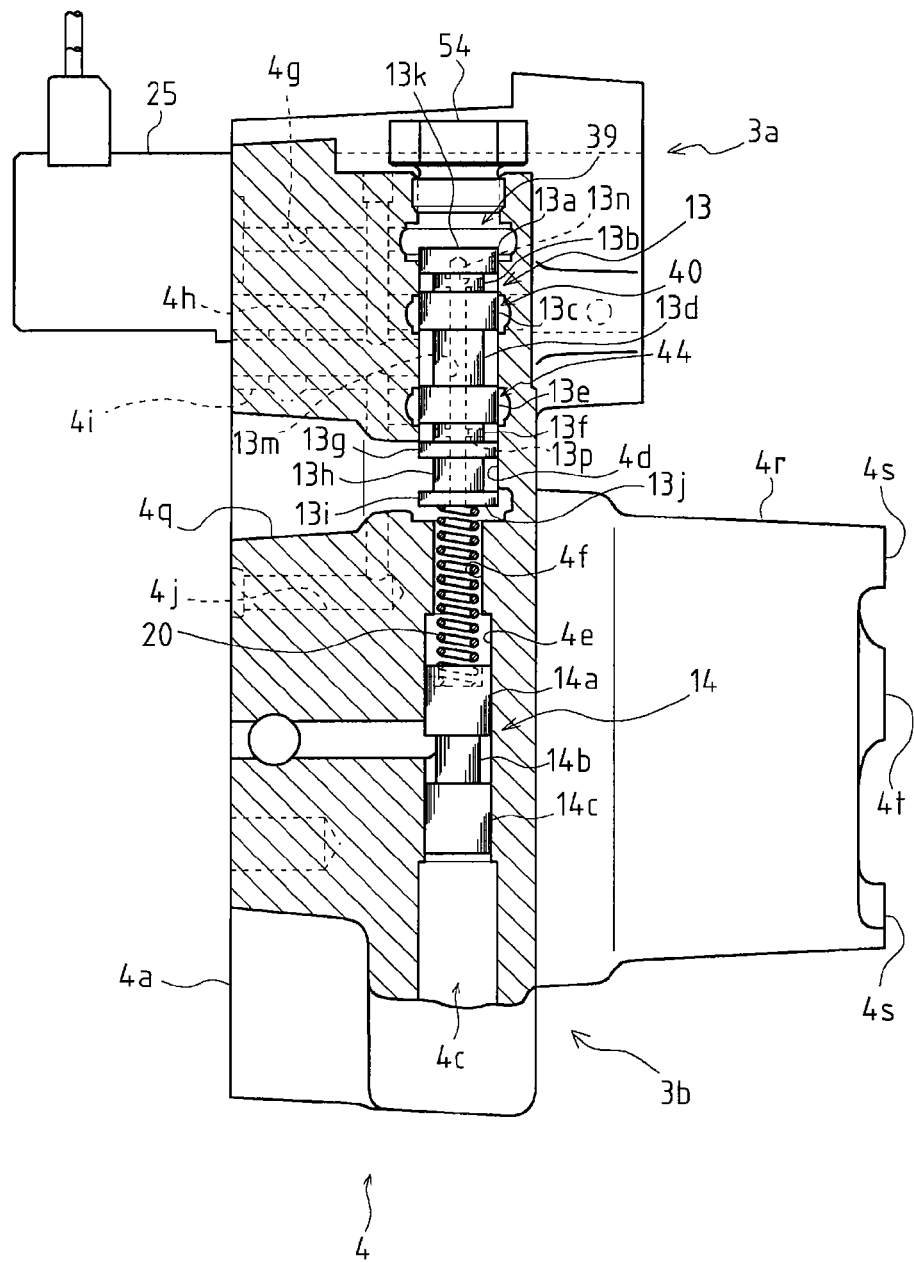
FIG. 4 is a side view, partially in cross-section, of a hydraulic servo mechanism according to an embodiment of the present invention.
Figure 5:
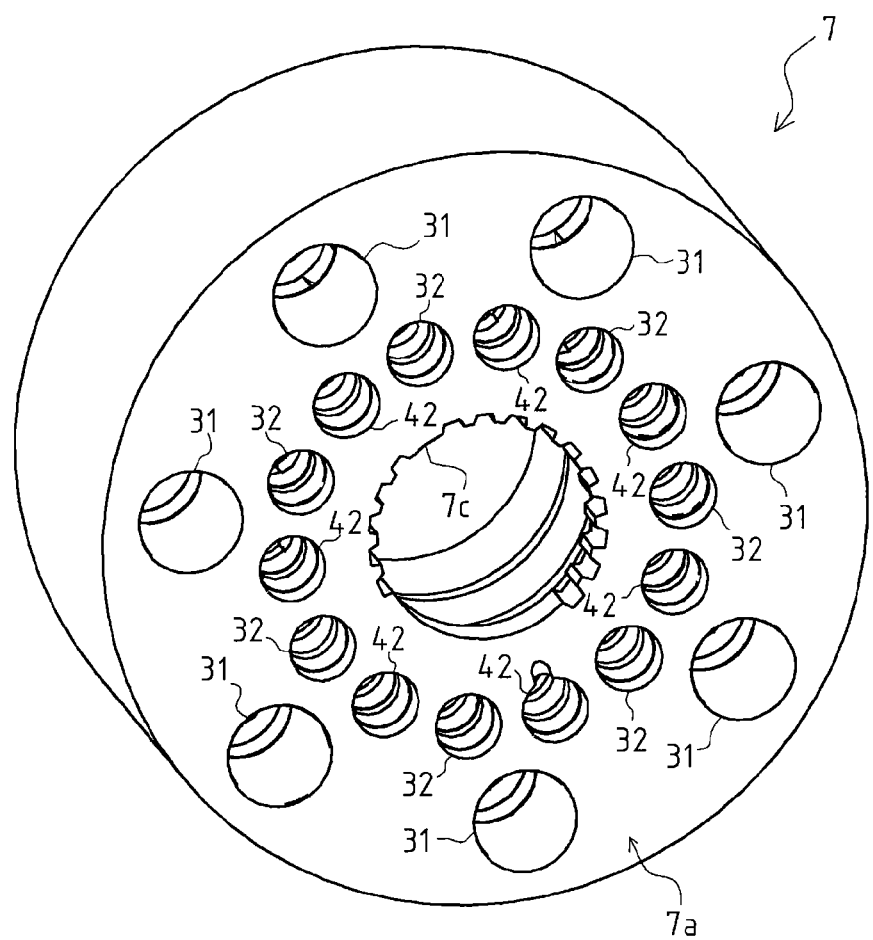
FIG. 5 is a perspective view of a cylinder block according to an embodiment of the present invention.
Figure 6:
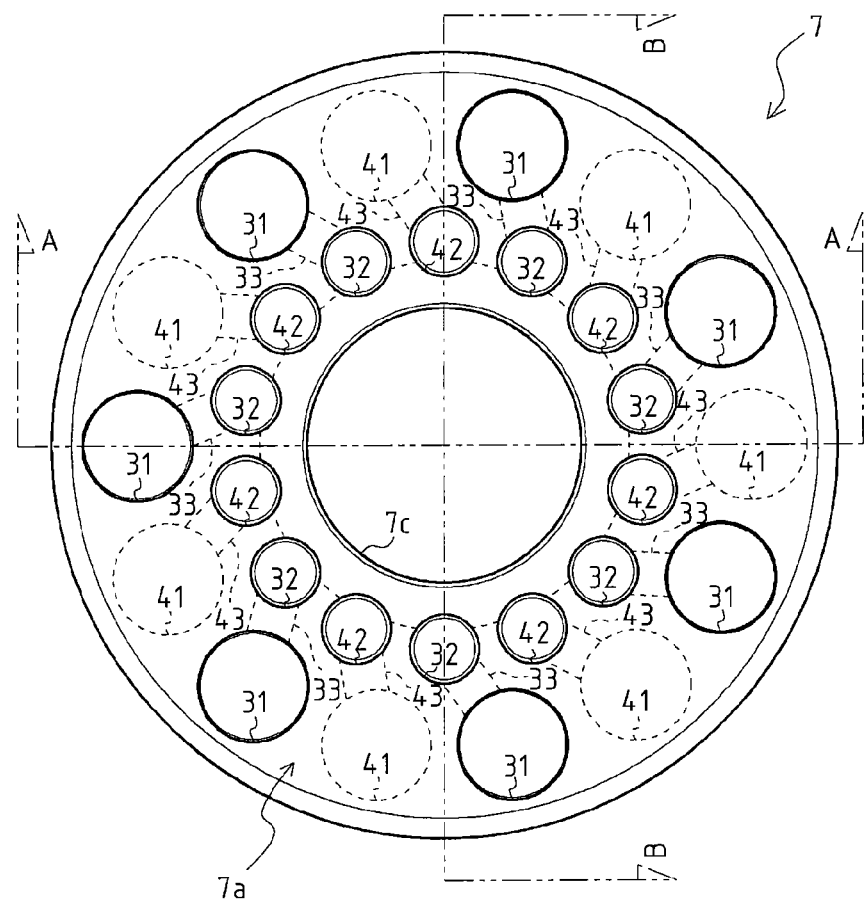
FIG. 6 is a rear view of the cylinder block.
Figure 7:
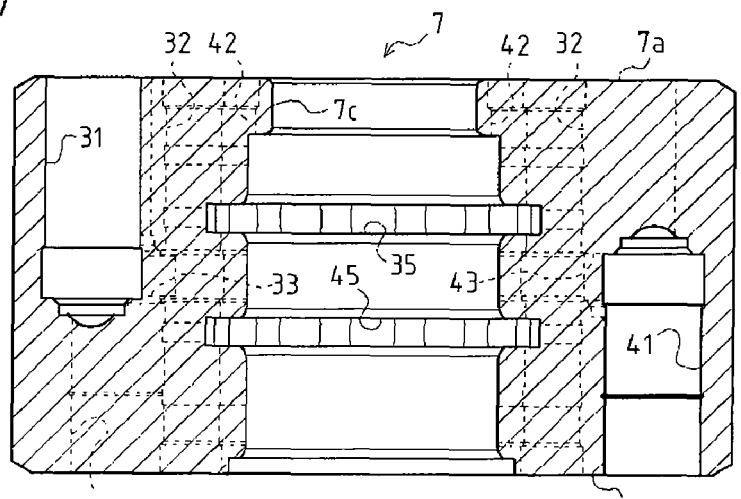
FIG. 7 is arrow cross-sectional views of the lines A-A and B-B in FIG. 5.
Figure 7:
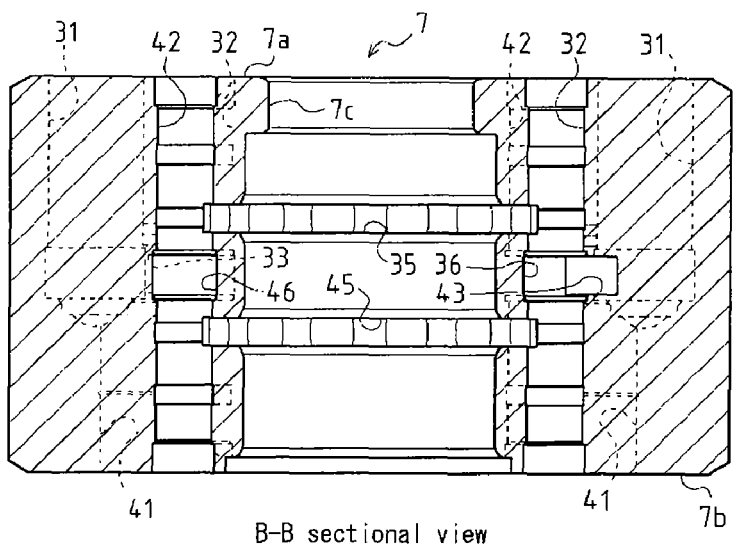
Figure 8:
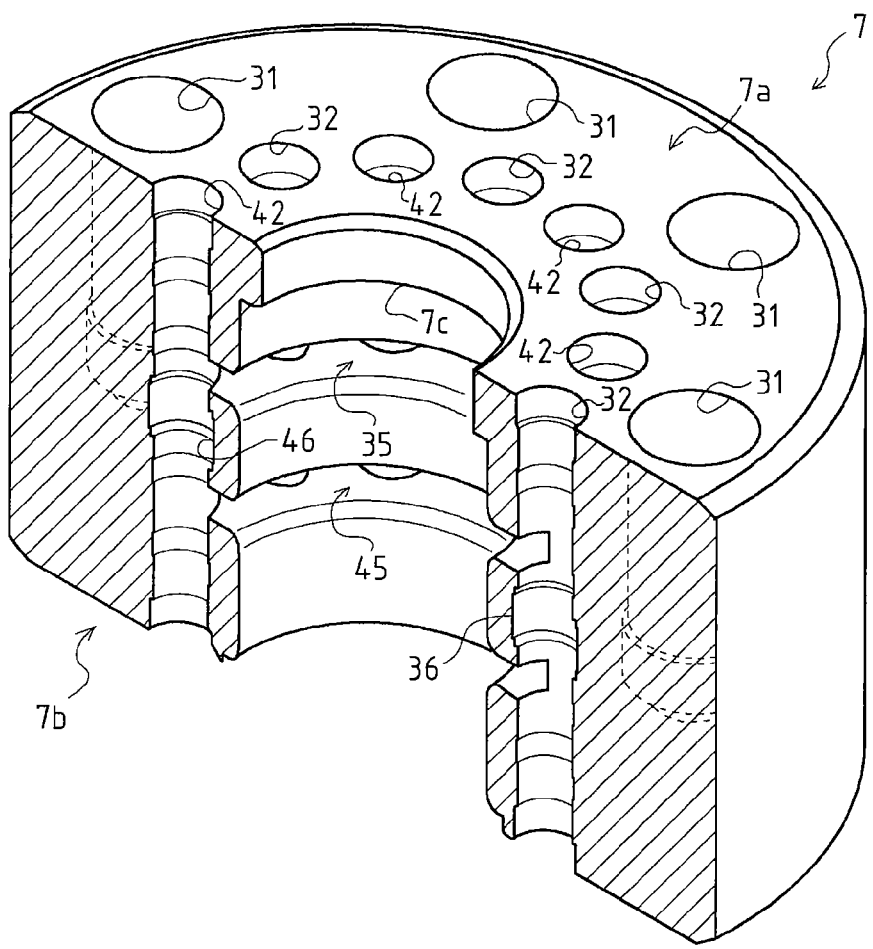
FIG. 8 is a cross-sectional perspective view of the line B-B.
Figure 9:
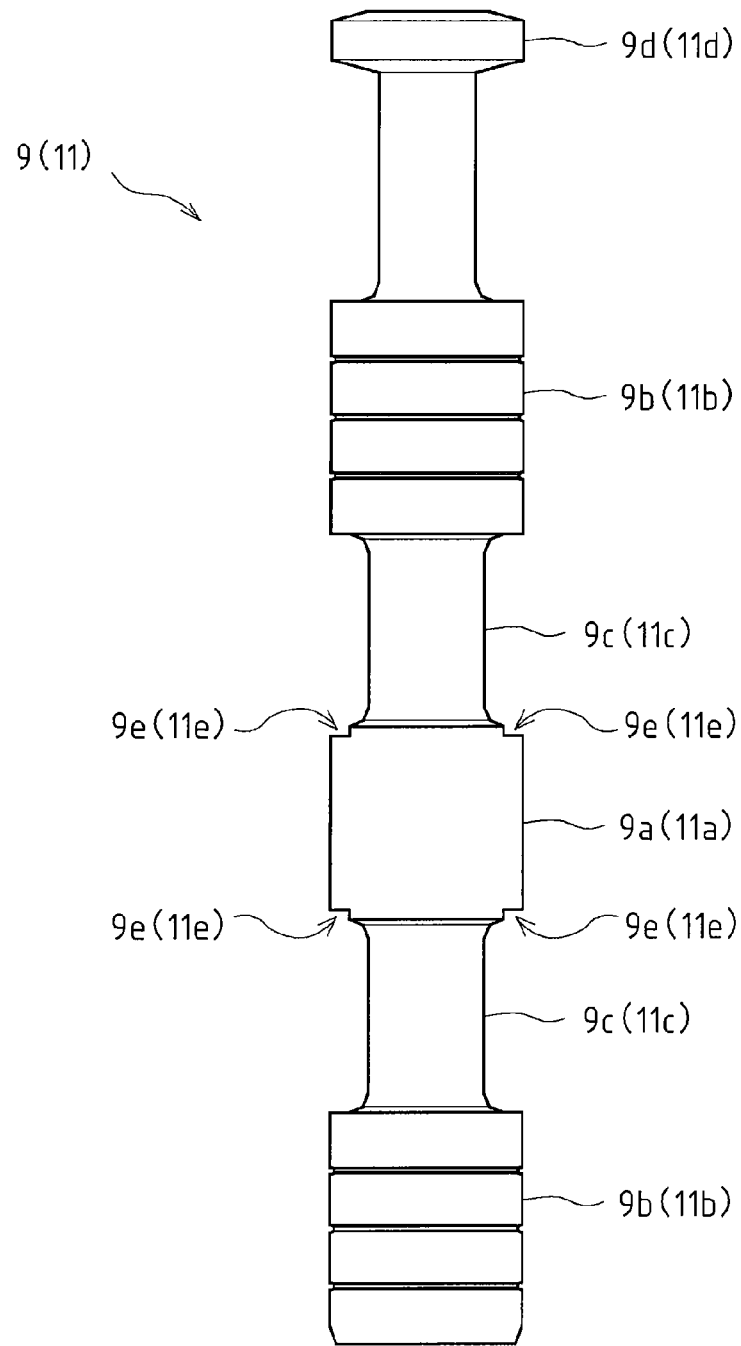
FIG. 9 is a plan view of a timing spool according to an embodiment of the present invention.
Figure 10:
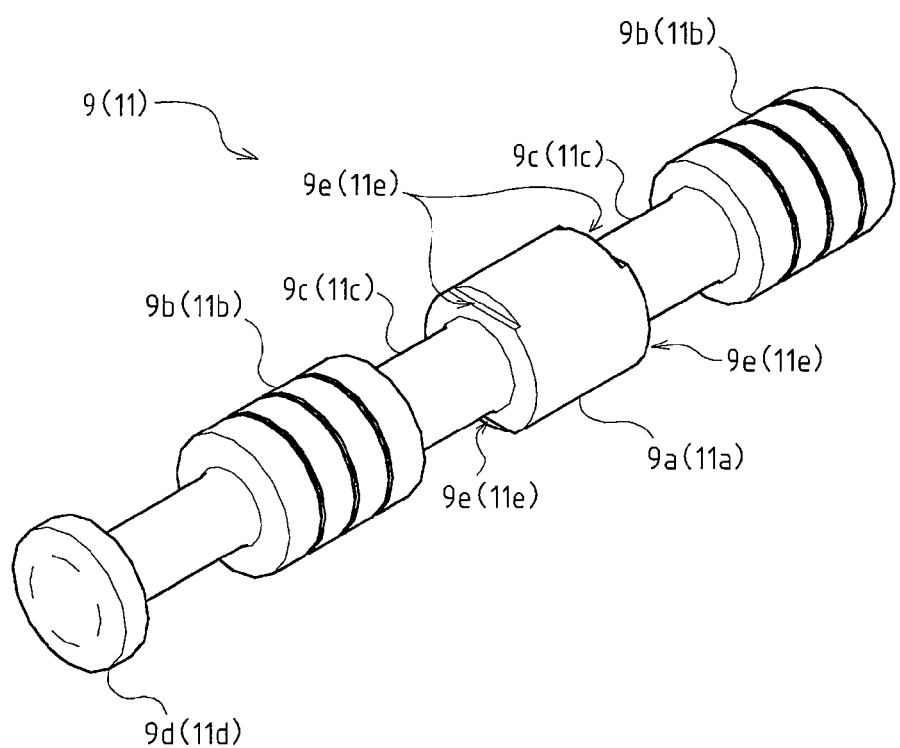
FIG. 10 is a perspective view of the timing spool.
Figure 11:
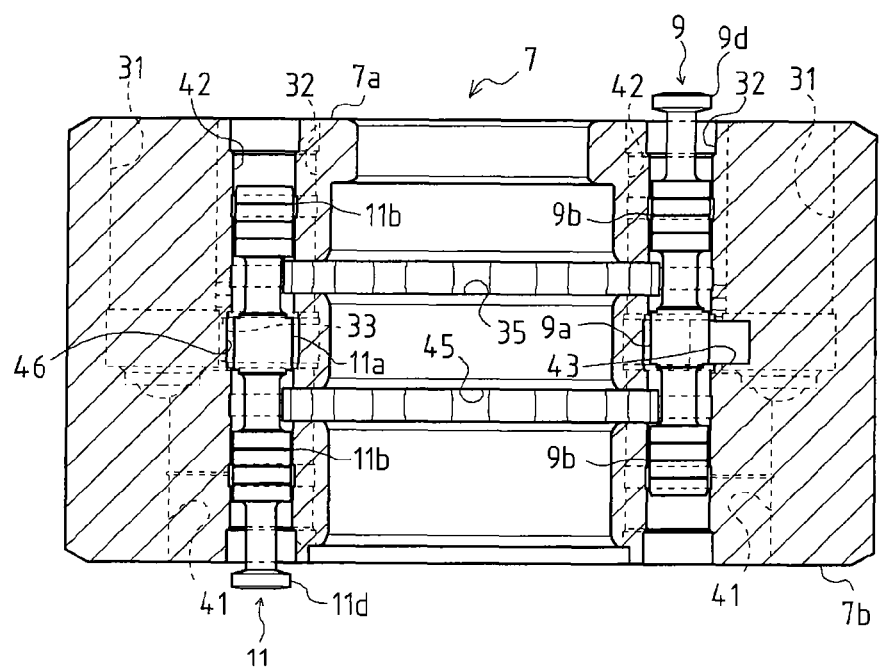
FIG. 11 is a side view, partially in cross-section, of the timing spool inserted into the cylinder block.
Figure 12:
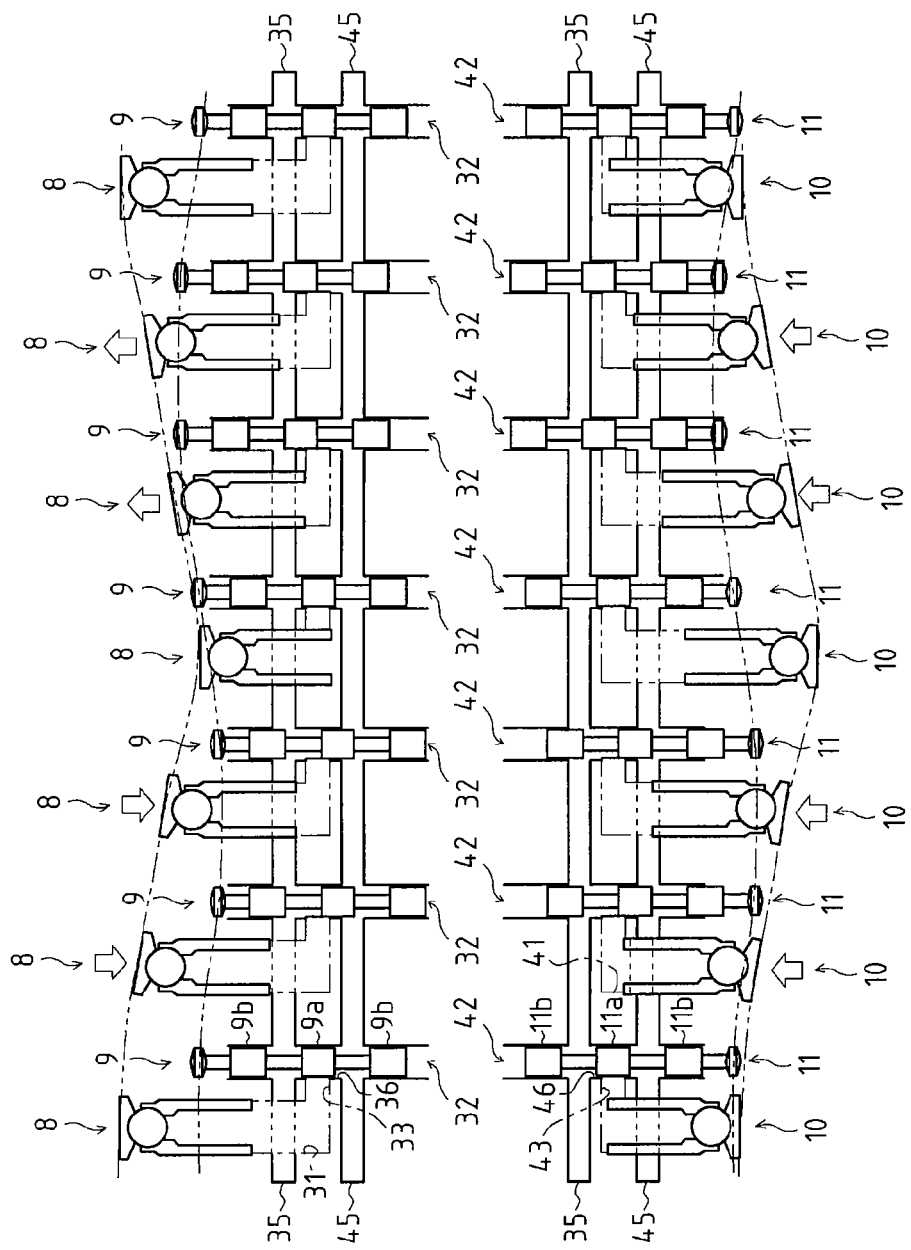
FIG. 12 is a schematic view of actuation of the timing spools and plungers according to an embodiment of the present invention.
Figure 13:
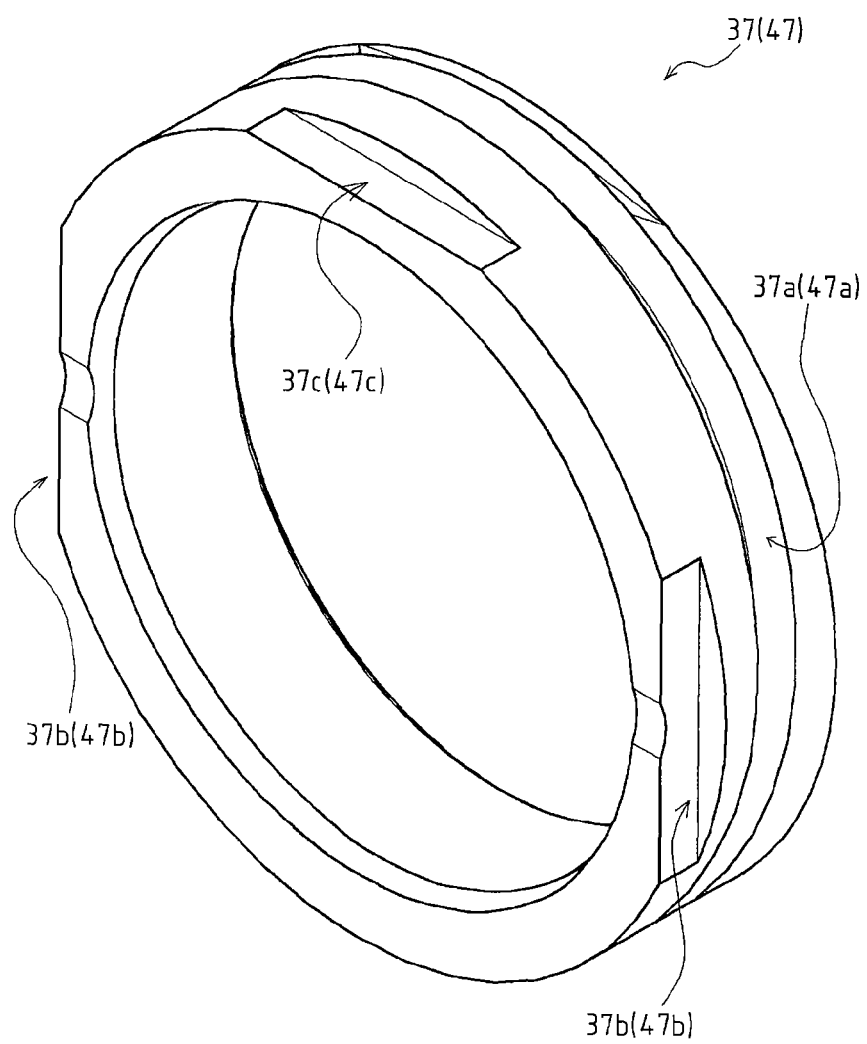
FIG. 13 is a perspective view of a spool cam according to an embodiment of the present invention.
Figure 14:
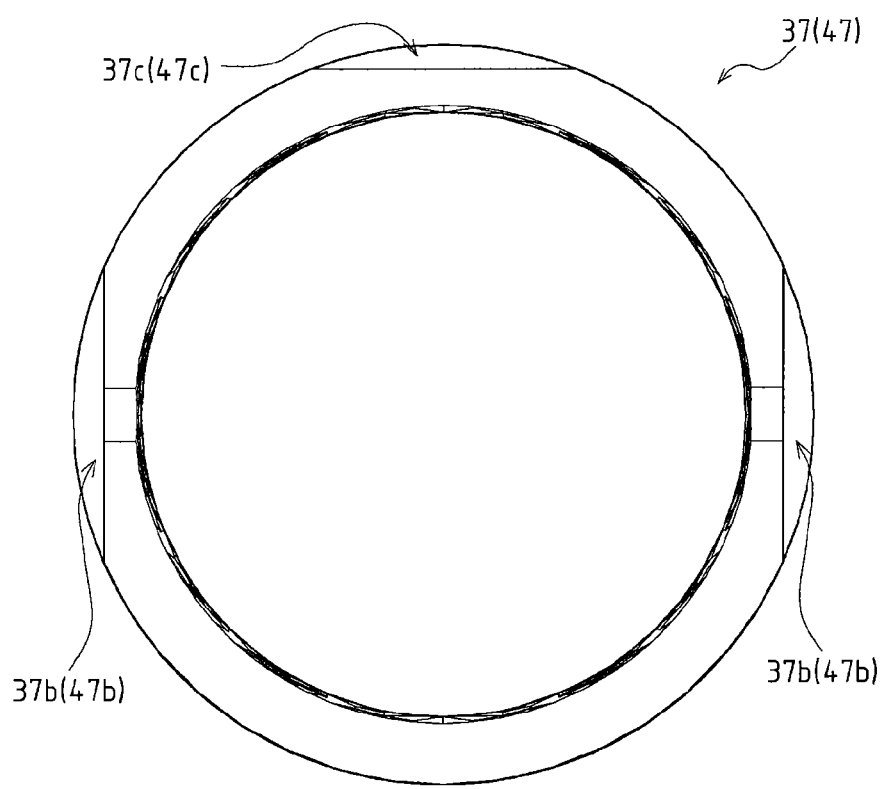
FIG. 14 is a front view of the spool cam.
Figure 15:
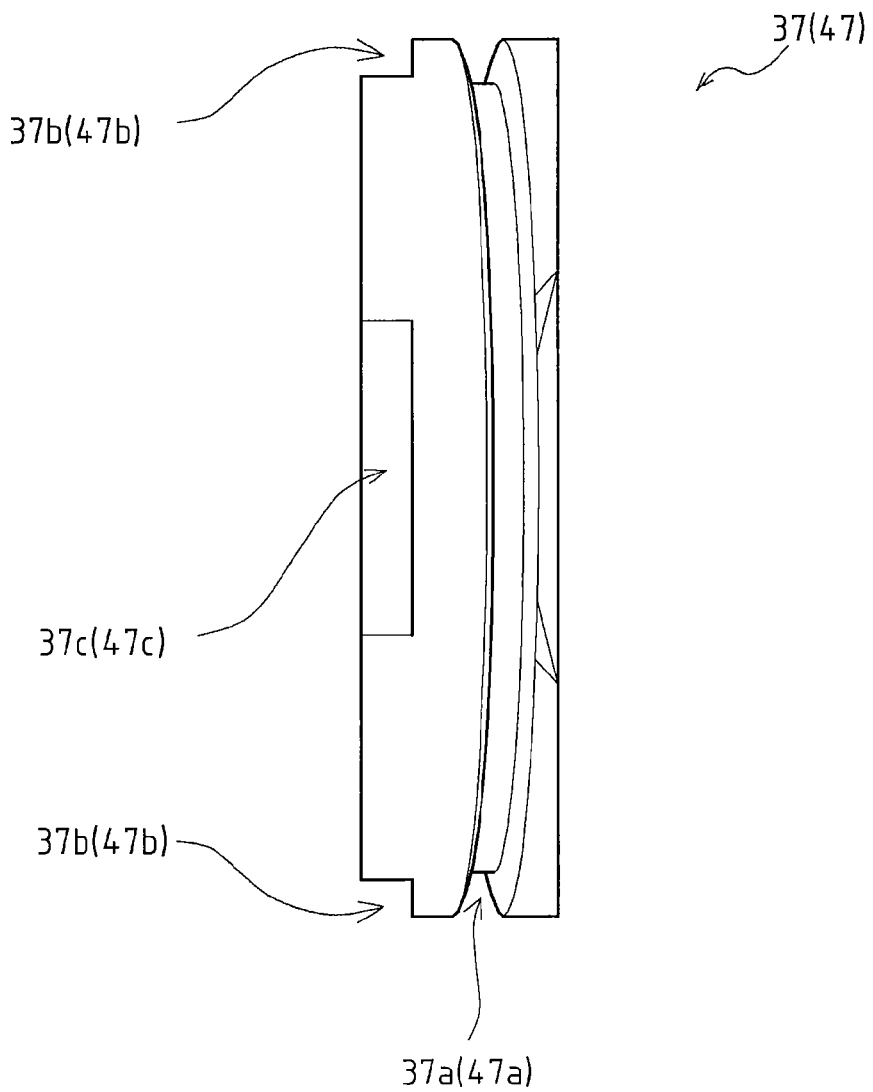
FIG. 15 is a left side view of the spool cam.
Figure 16:
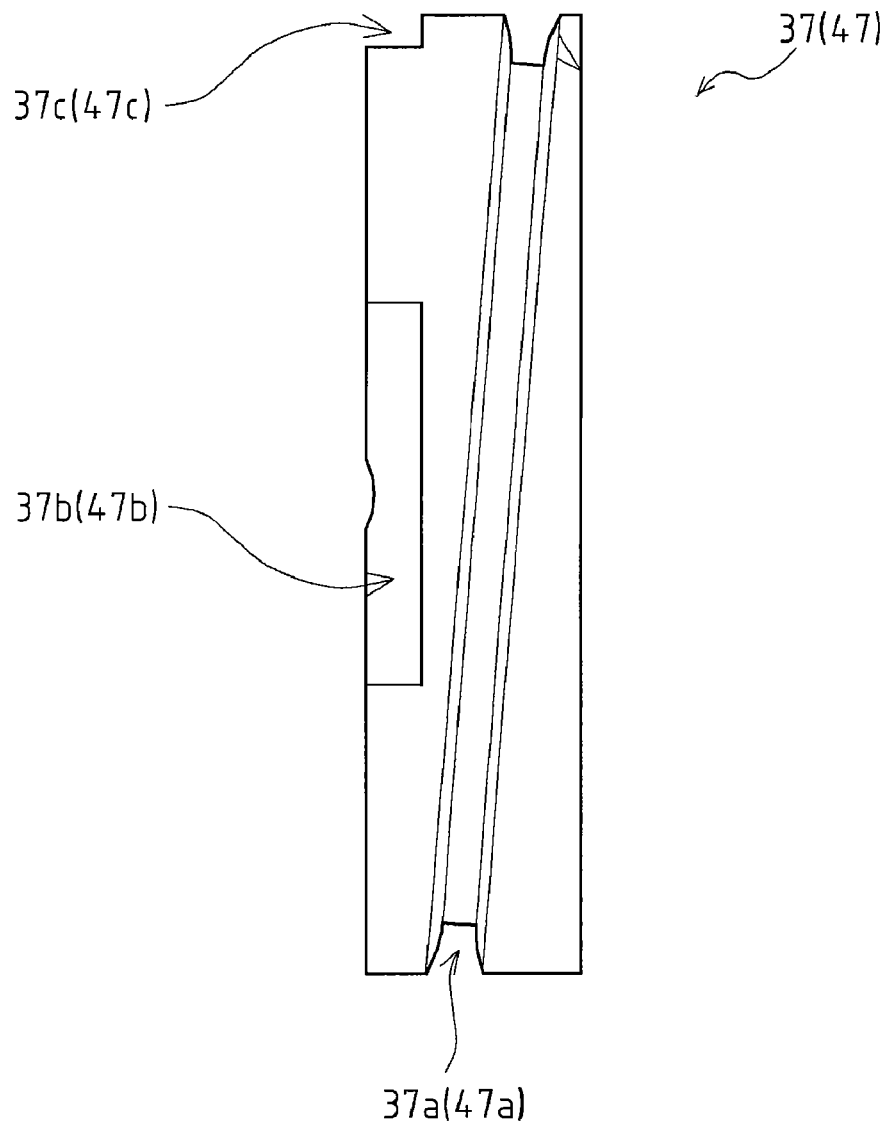
FIG. 16 is a plan view of the spool cam.
Figure 17:
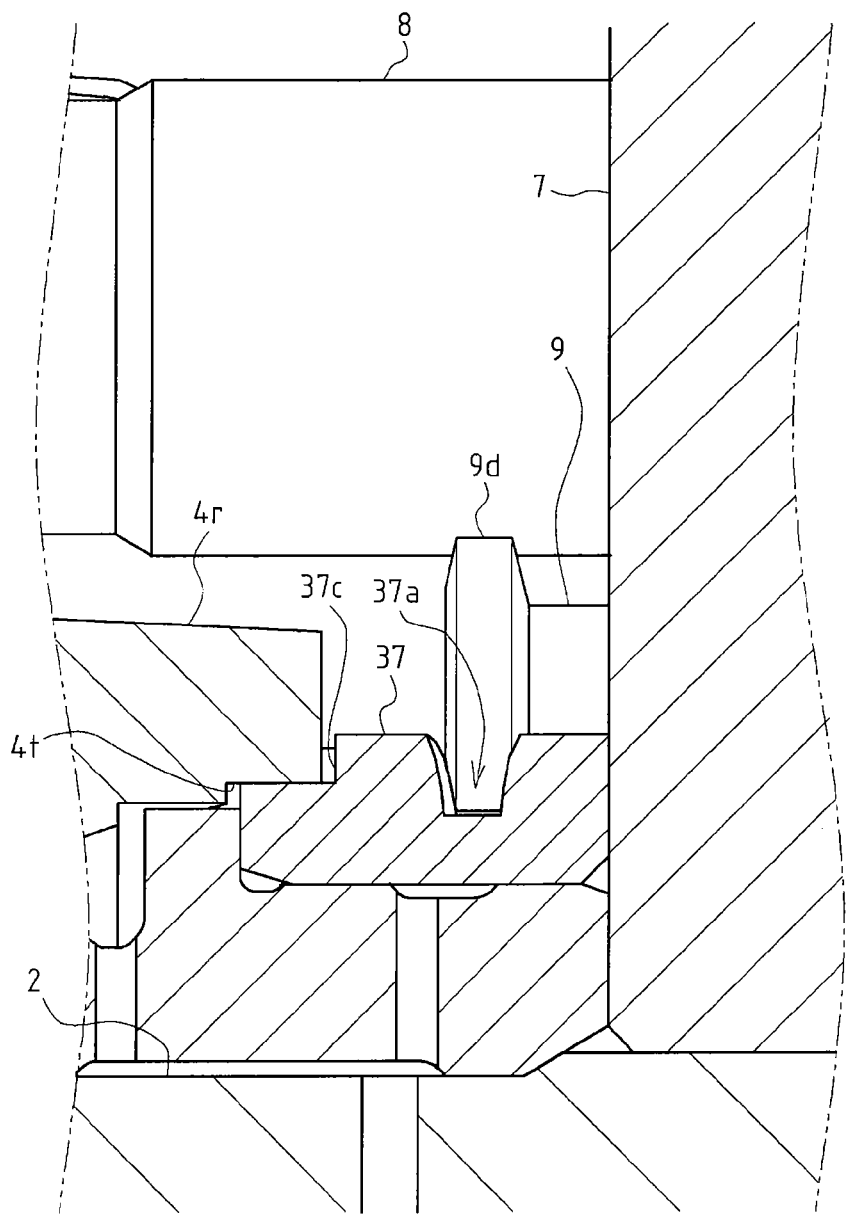
FIG. 17 is an enlarged drawing of an input side spool cam engagement part.
Figure 18:
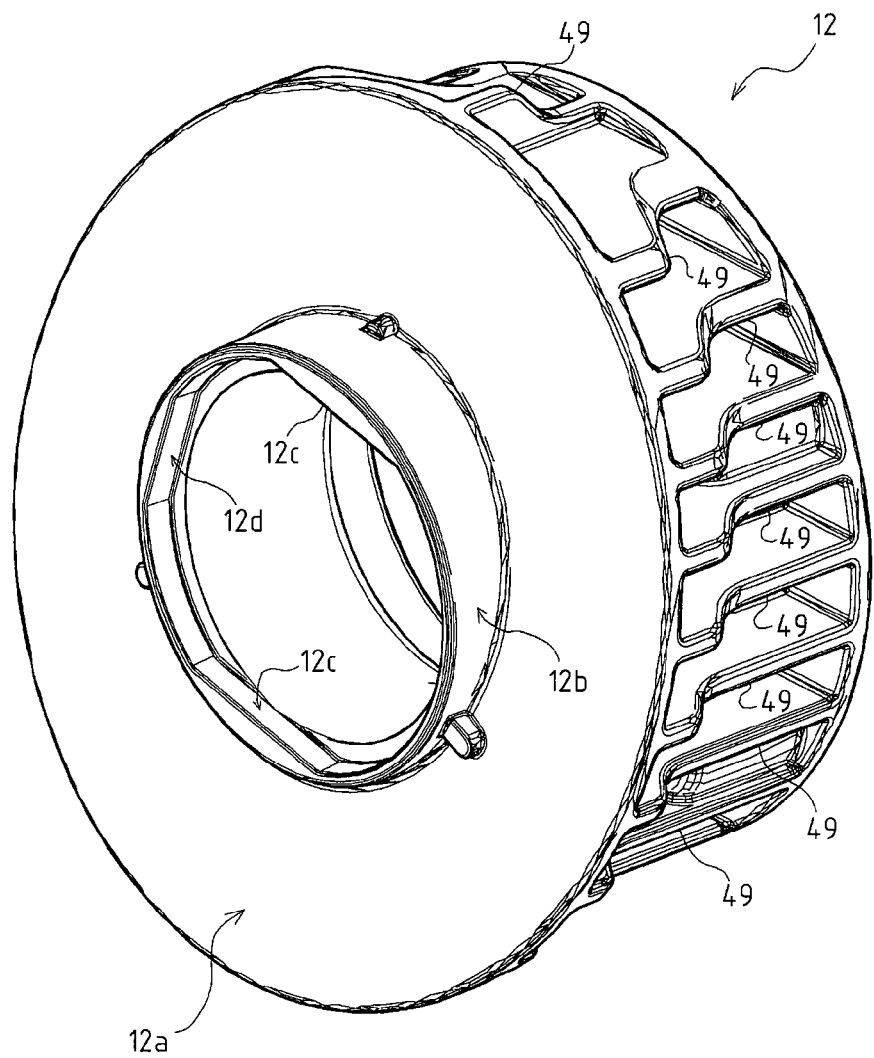
FIG. 18 is a perspective view of an output side swash plate according to an embodiment of the present invention.
Figure 19:
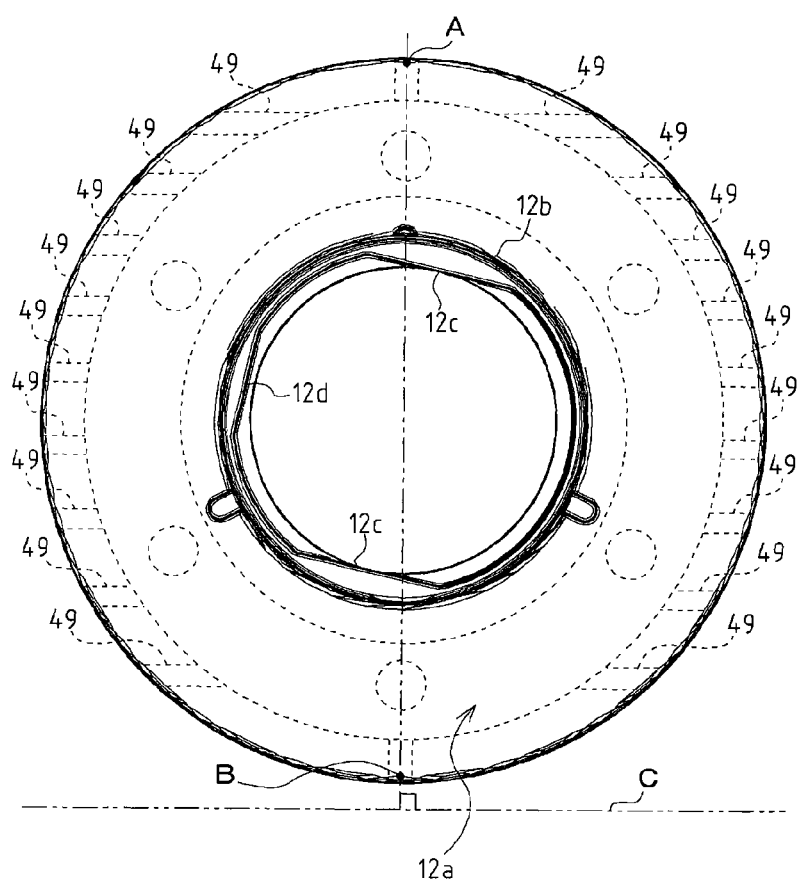
FIG. 19 is a front view of the output side swash plate.
Figure 20:
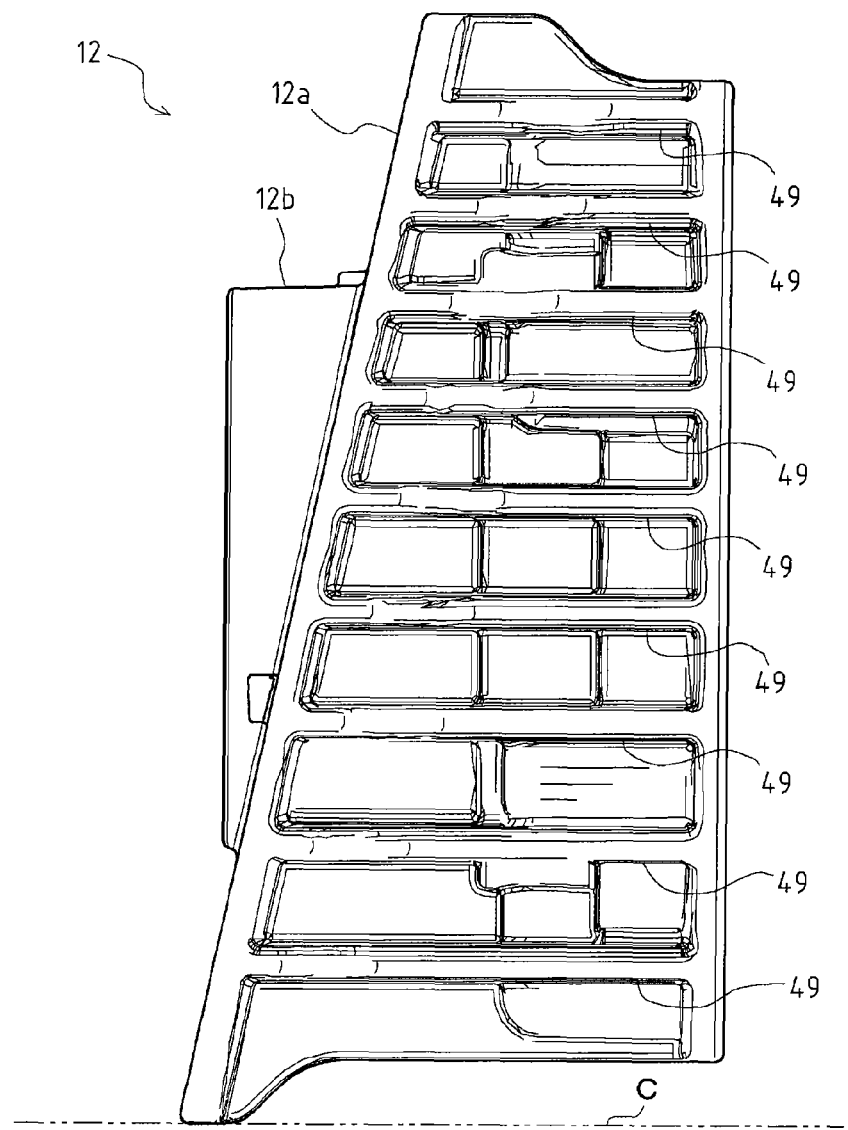
FIG. 20 is a left side view of the output side swash plate.
Figure 21:
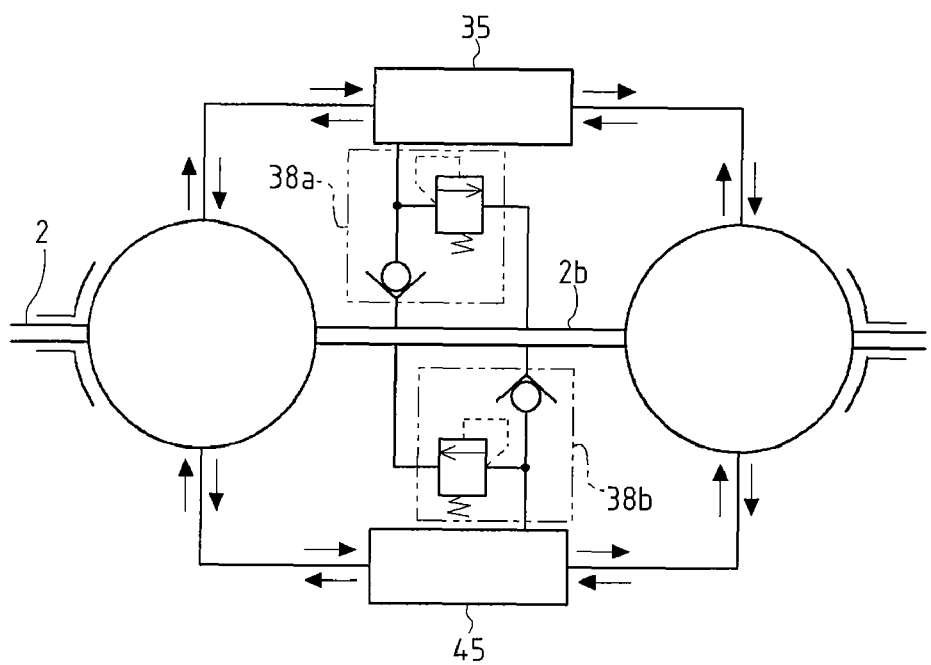
FIG. 21 is a system diagram of a hydraulic system of a check relief valve according to an embodiment of the present invention.
Figure 22:
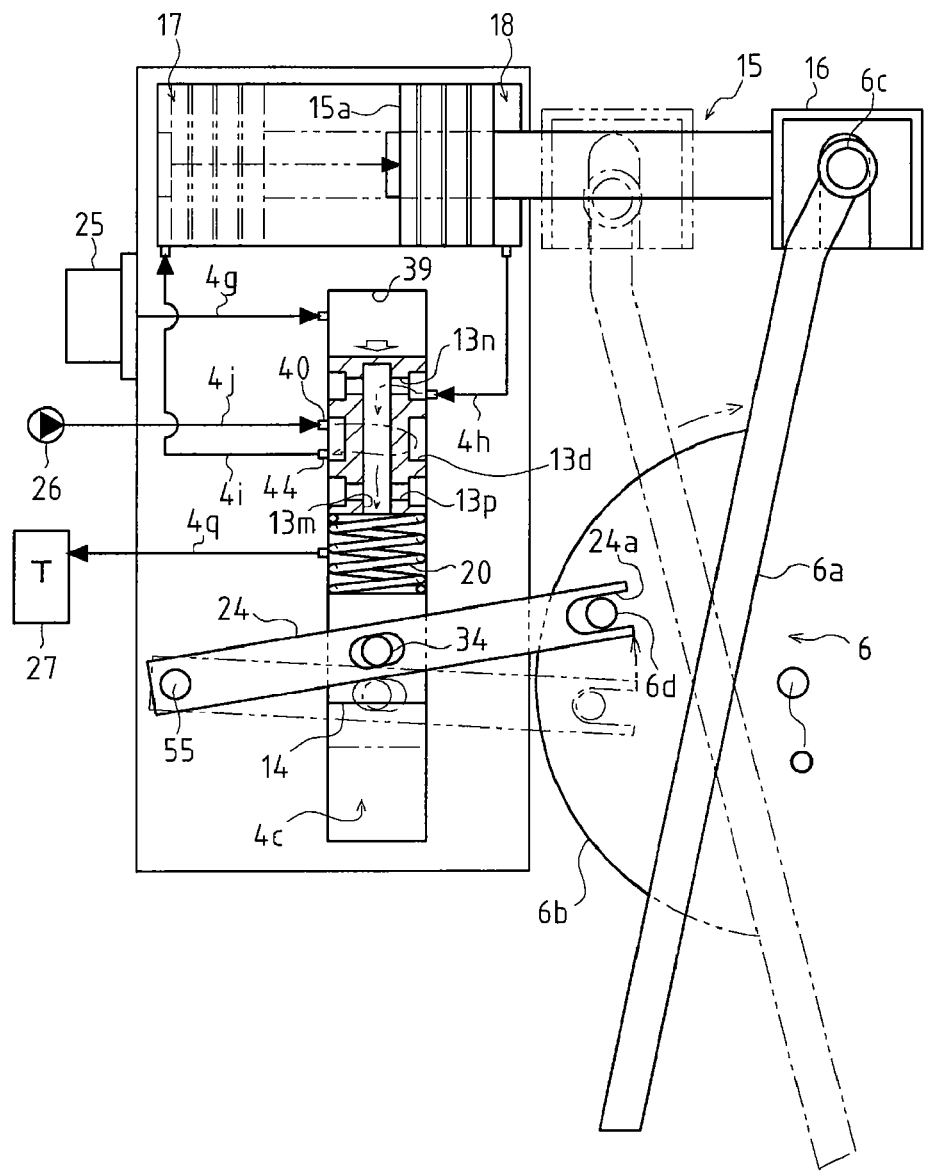
FIG. 22 is a development of a first mode of the hydraulic servo mechanism according to an embodiment of the present invention.
Figure 23:
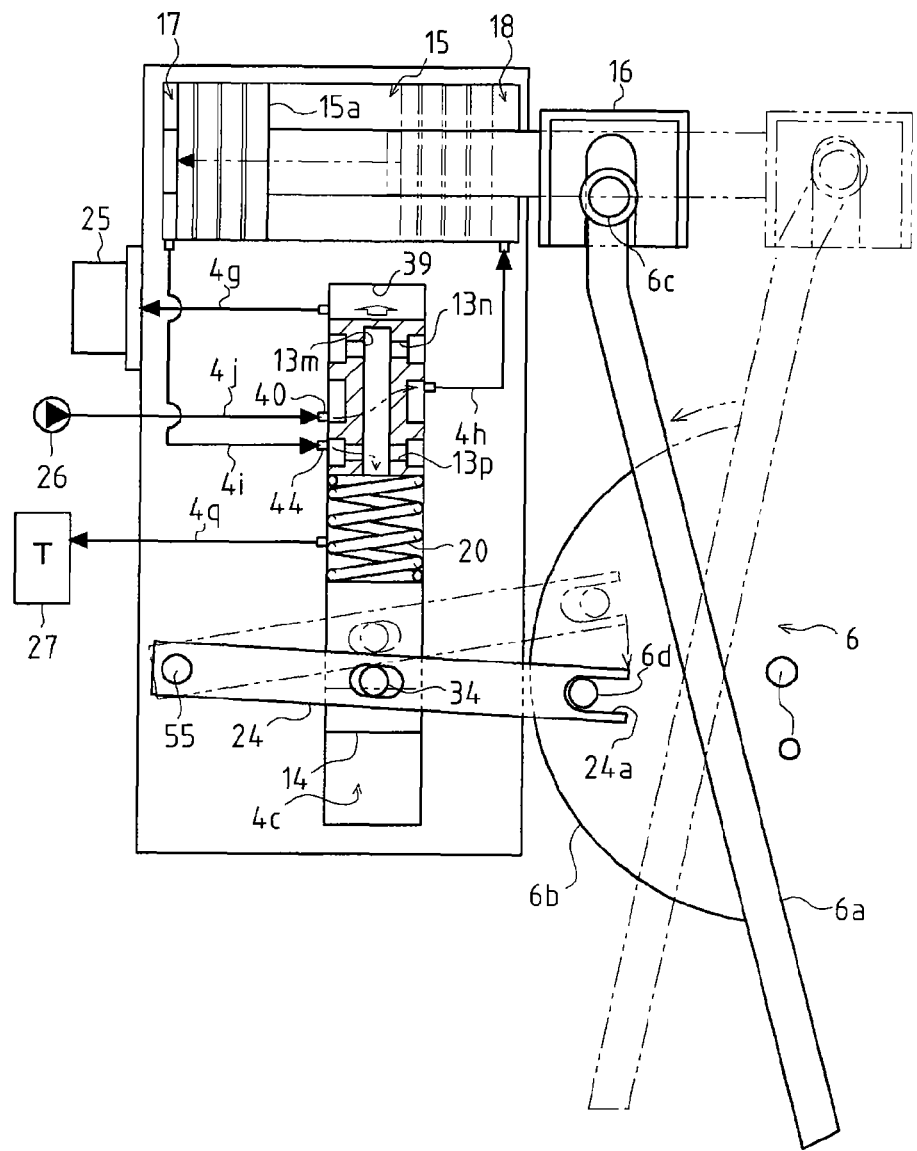
FIG. 23 is a development of a second mode of the hydraulic servo mechanism.
Figure 24:
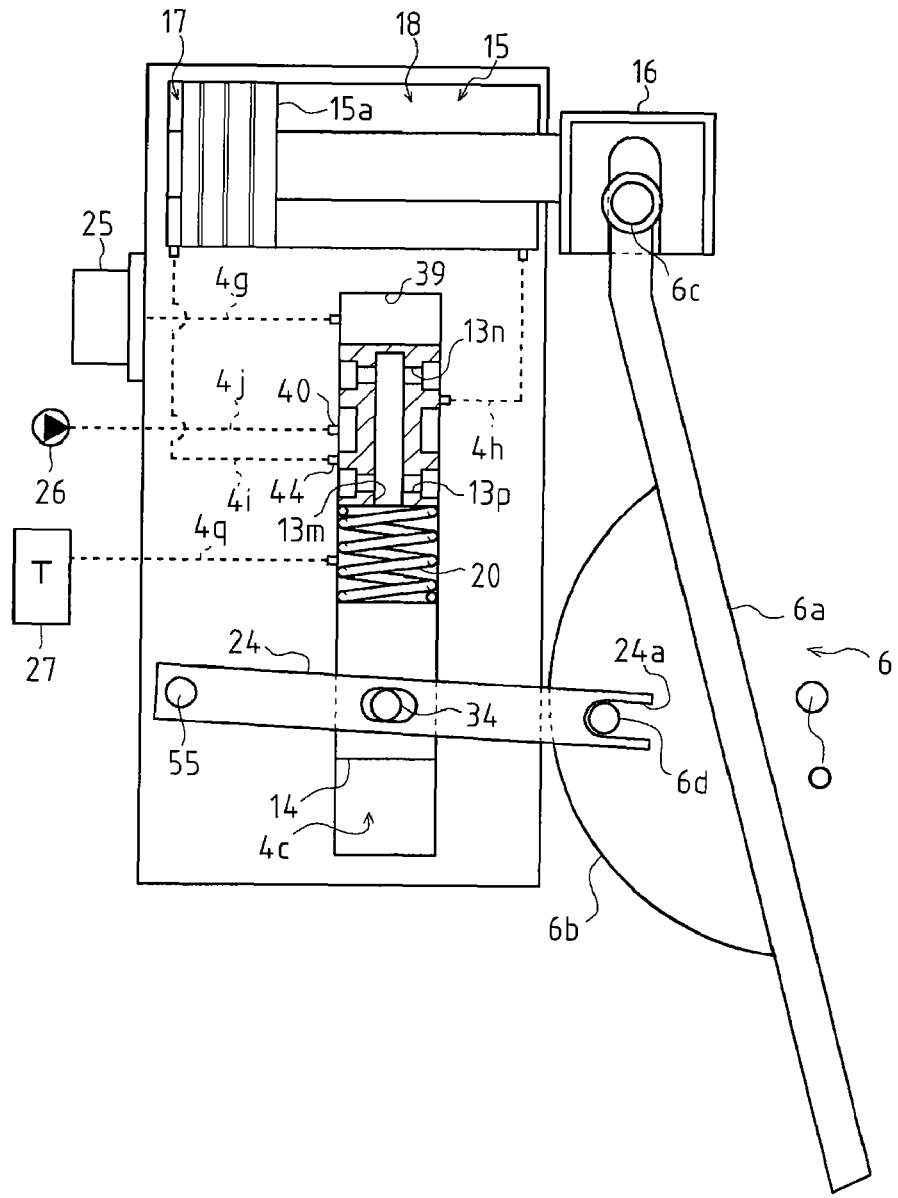
FIG. 24 is a development of a third mode of the hydraulic servo mechanism.
Figure 25:
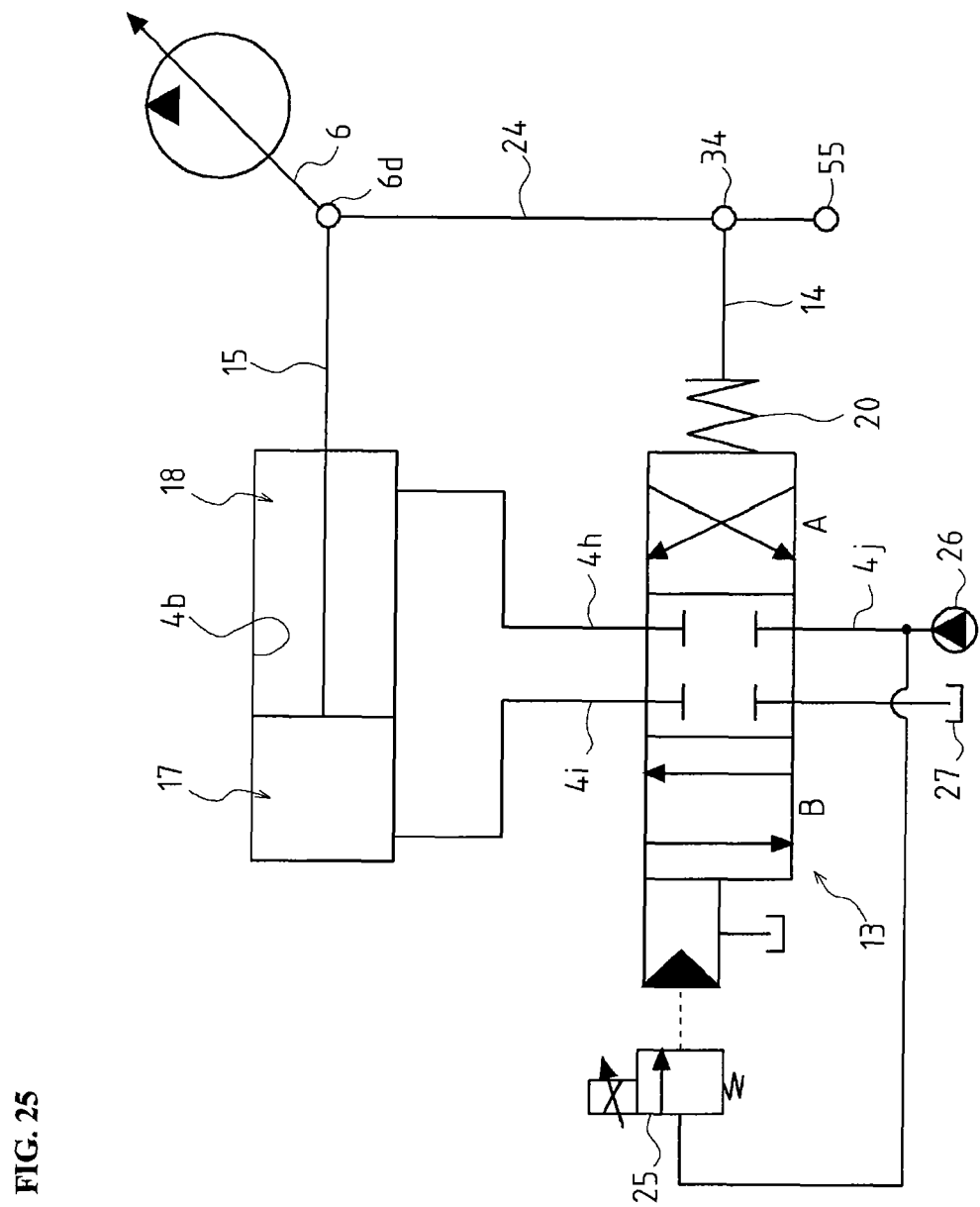
FIG. 25 is a hydraulic system diagram of the hydraulic servo mechanism.

FIG. 1 is a side view, partially in cross-section, of entire construction of a hydraulic stepless transmission according to an embodiment of the present invention. FIG. 2 is a perspective view of the entire construction of the hydraulic stepless transmission. FIG. 3 is a perspective view of entire construction of an input side housing. FIG. 4 is a side view, partially in cross-section, of a hydraulic servo mechanism according to an embodiment of the present invention. FIG. 5 is a perspective view of a cylinder block according to an embodiment of the present invention. FIG. 6 is a rear view of the cylinder block. FIG. 7 is arrow cross-sectional views of the lines A-A and B-B in FIG. 5. FIG. 8 is a cross-sectional perspective view of the line B-B. FIG. 9 is a plan view of a timing spool according to an embodiment of the present invention. FIG. 10 is a perspective view of the timing spool. FIG. 11 is a side view, partially in cross-section, of the timing spool inserted into the cylinder block. FIG. 12 is a schematic view of actuation of the timing spools and plungers according to an embodiment of the present invention. FIG. 13 is a perspective view of a spool cam according to an embodiment of the present invention. FIG. 14 is a front view of the spool cam. FIG. 15 is a left side view of the spool cam. FIG. 16 is a plan view of the spool cam. FIG. 17 is an enlarged drawing of an input side spool cam engagement part. FIG. 18 is a perspective view of an output side swash plate according to an embodiment of the present invention. FIG. 19 is a front view of the output side swash plate. FIG. 20 is a left side view of the output side swash plate. FIG. 21 is a system diagram of a hydraulic system of a check relief valve according to an embodiment of the present invention. FIG. 22 is a development of a first mode of the hydraulic servo mechanism according to an embodiment of the present invention. FIG. 23 is a development of a second mode of the hydraulic servo mechanism. FIG. 24 is a development of a third mode of the hydraulic servo mechanism. FIG. 25 is a hydraulic system diagram of the hydraulic servo mechanism.

Firstly, explanation will be given on entire construction of a hydraulic stepless transmission 1 referring to FIGS. 1 to 21.

For convenience of the explanation, a direction of an arrow A in FIG. 1 is regarded as the forward direction.

As shown in FIG. 1, the hydraulic stepless transmission 1 according to an embodiment of the present invention is constructed by a variable capacity type hydraulic pump and a fixed capacity type hydraulic motor and mainly comprises an input shaft 2, input side plungers 8 which are first plungers reciprocating along the axial direction of the input shaft 2, output side plungers 10 which are second plungers, input side timing spools 9 which are first spools reciprocating along the axial direction, output side timing spools 11 which are second spools, a cylinder block 7 which houses the plungers 8 and 10 and the timing spools 9 and 11 and is rotated integrally with the input shaft 2, an input side swash plate 6 which touches the input side plungers 8 with its swash plate surface whose slant angle about the axis is variable, an output side swash plate 12 which is rotated while touching the output side plungers 10 with its swash plate surface whose slant angle about the axis is fixed, and a hydraulic servo mechanism 3 which is a driving mechanism of the input side swash plate 6.

With regard to the hydraulic stepless transmission 1 according to the embodiment of the present invention, the hydraulic pump comprises a swash plate holding member 5, the input side swash plate 6, the cylinder block 7, the input side plungers 8, the input side timing spools 9, an input side spool cam 37 and the like, and the hydraulic motor comprises the cylinder block 7, the output side plungers 10, the output side timing spools 11, an output side spool cam 47, the output side swash plate 12 and the like.

Accordingly, the plungers 8 and 10 of the hydraulic pump and the hydraulic motor are housed in the one cylinder block 7 for compactness.

Explanation will be given on entire construction of the input shaft 2 in detail referring to FIG. 1.

The input shaft 2 transmits driving power from a drive source such as an engine to the hydraulic stepless transmission 1. An oil passage 2b is bored at the axial center of the input shaft 2 along the axis. A diameter enlarged portion in which check relief valves 38a and 38b are provided is formed at the substantial center of the input shaft 2 in the axial direction. The input shaft 2 is rotatably pivoted by an input side housing 4 through an input side conical bearing 21 and an input side needle bearing 22. An inner wheel of the input side conical bearing 21 is fixed to the input shaft 2 so as not to be rotatable relatively by a spacer 60 and an input side bearing locknut 23 screwed from a tip 2a of the input shaft 2. The cylinder block 7 is spline-fitted to the input shaft 2 so as not to be rotatable relatively.

Explanation will be given on the input side housing 4, which is a baring member pivotally supporting the input shaft 2 in detail referring to FIGS. 1 to 4.

As shown in FIGS. 1 to 3, the input side housing 4 comprises a bearing housing part 4a which is a basic construction part of the input side housing 4, an output part 3a of the hydraulic servo mechanism 3 formed above the bearing housing part 4a, and a regulation part 3b of the hydraulic servo mechanism 3 formed laterally before the output part 3a.

The arrangement of the output part 3a and the regulation part 3b of the hydraulic servo mechanism 3 is not limited thereto and can be changed suitably.

A through-hole is bored in the bearing housing part 4a so that the input shaft 2 penetrates the hole. The front portion of inner peripheral surface of the through-hole is engaged with an outer wheel of the input side conical bearing 21, and the rear portion thereof is engaged with the input side needle bearing 22.

As shown in FIGS. 1 to 3, the output part 3a of the hydraulic servo mechanism 3 comprises an output cylinder 4b formed longitudinally above the bearing housing part 4a, a power piston 15 inserted into the output cylinder 4b so as to be slidable longitudinally reciprocally, a hanging member 16 fixed to the rear portion of the power piston 15, and the like.

A diameter enlarged portion 15a is formed at the front end of the power piston 15.

The front end surface of the diameter enlarged portion 15a and the output cylinder 4b constitute a front oil chamber 17, and rear end surface of the diameter enlarged portion 15a and the output cylinder 4b constitute a rear oil chamber 18. The hydraulic pressure in each of the chambers 17 and 18 is varied so as to slide the power piston 15 longitudinally reciprocally.

A regulation bolt 19 is screwed into a wall part at the front side of the front oil chamber 17 and the rear end of the regulation bolt 19 touches the front end surface of the diameter enlarged portion 15a.

According to the construction, the length of the part of the regulation bolt 19 facing the inside of the output cylinder 4b restricts the forward sliding position of the power piston 15. The regulation bolt 19 can be fixed by a locknut 53 so as to maintain the length of the part of the regulation bolt 19 facing the inside of the output cylinder 4b.

The hanging member 16 is substantially U-like shaped when viewed in cross-section and a hanged part 6c of the input side swash plate 6 is hanged thereon. The hanging member 16 is fixed to the rear end of the power piston 15 while the opening of the U-like shape is arranged downward.

Accordingly, the power piston 15 is constructed by the cylinder rod so as to miniaturize the hydraulic stepless transmission 1.

In this embodiment, the power piston 15 is constructed by the cylinder rod and this construction is advantageous to miniaturization of the whole hydraulic apparatus.

However, the construction of the power piston 15 is not limited thereto.

As shown in FIG. 4, the regulation part 3b of the hydraulic servo mechanism 3 comprises a regulation cylinder 4c formed vertically at the left side of the bearing housing part 4a, a servo spool 13 inserted into the regulation cylinder 4c so as to be slidable vertically reciprocally, a feedback spool 14 inserted into the regulation cylinder 4c below the servo spool 13, a spring member 20 interposed between the servo spool 13 and the feedback spool 14, and the like.

The servo spool 13 comprises a plurality of diameter enlarged portions (lands) and a plurality of diameter reduction portions, a first diameter enlarged portion 13a, a first diameter reduction portion 13b, a second diameter enlarged portion 13c, a second diameter reduction portion 13d, a third diameter enlarged portion 13e, a third diameter reduction portion 13f, a fourth diameter enlarged portion 13g, a fourth diameter reduction portion 13h, and a fifth diameter enlarged portion 13i, in this order from the upper side to the lower side.

An oil passage 13m is bored on the axis of the servo spool 13 from a lower end surface 13j of the servo spool 13 to the substantial vertical center of the first diameter enlarged portion 13a. The oil passage 13m is communicated with a pressurized oil tank 27 (not shown) through an oil passage bored in the bearing housing part 4a so that pressurized oil is drained to the pressurized oil tank 27 through the oil passage 13m and a connection port 4q. The oil passage 13m is communicated with an oil passage 13n bored in the first diameter reduction portion 13b and an oil passage 13p bored in the third diameter reduction portion 13f.

The regulation cylinder 4c comprises a first expanded portion 4d whose inner diameter is substantially the same as the outer diameter of each of the diameter enlarged portions 13a, 13c, 13e, 13g and 13i of the servo spool 13, a second expanded portion 4e whose inner diameter is substantially the same as the outer diameter of the diameter enlarged portion of the feedback spool 14, and a contraction part 4f whose inner diameter is large enough to house the spring member 20 and which communicates the first expanded portion 4d with the second expanded portion 4e.

The top of the first expanded portion 4d is closed by a plug 54, and the plug 54, the first expanded portion 4d and an upper end surface 13k of the servo spool 13 constitute a top oil chamber 39. An oil passage 4g communicates the top oil chamber 39 with a proportional regulation valve 25. Oil pressure in the top oil chamber 39 can be regulated by regulating the proportional regulation valve 25.

An upper oil chamber 40 whose diameter is larger than the outer diameter of each of the diameter enlarged portions 13a, 13c, 13e, 13g and 13i of the servo spool 13 is formed in the upper middle portion of the first expanded portion 4d. An oil passage 4h communicates the upper oil chamber 40 with the rear oil chamber 18. The upper oil chamber 40 can select one of three modes following the vertical position of the servo spool 13. The upper oil chamber 40 is communicated with the first diameter reduction portion 13b of the servo spool 13 in the first mode, communicated with the second diameter reduction portion 13d of the servo spool 13 in the second mode, and is not communicated with any oil chamber or the like in the third mode.

A lower oil chamber 44 whose diameter is also larger than the outer diameter of each of the diameter enlarged portions 13a, 13c, 13e, 13g and 13i of the servo spool 13 is formed in the lower middle portion of the first expanded portion 4d. An oil passage 4i communicates the lower oil chamber 44 with the front oil chamber 17. Similar to the upper oil chamber 40, the lower oil chamber 44 can select one of three modes following the vertical position of the servo spool 13. The lower oil chamber 44 is communicated with the second diameter reduction portion 13d of the servo spool 13 in the first mode, is communicated with the third diameter reduction portion 13f of the servo spool 13 in the second mode, and is not communicated with any oil chamber or the like in the third mode.

A space formed by the second diameter reduction portion 13d of the servo spool 13 and the regulation cylinder 4c is communicated with a charge pump 26 (not shown) through an oil passage 4j. High pressure oil is supplied to the oil chamber communicated with the second diameter reduction portion 13d (that is, the upper oil chamber 40 or the lower oil chamber 44).

The hydraulic servo mechanism 3 is constructed so that the power piston 15 and the servo spool 13 are commonly provided in the input side housing 4. Accordingly, the hydraulic stepless transmission 1 is miniaturized, and the power piston 15 and the servo spool 13 are arranged closely to each other so as to shorten the oil passage construction.

As shown in FIG. 4, the feedback spool 14 comprises first and second expanded portions 14a and 14c, whose inner diameter is substantially the same as the outer diameter of the second expanded portion 4e, and a contraction part 14b.

A link pin 34 is freely fitted on a recess formed by the contraction part 14b so that the feedback spool 14 is moved vertically following the vertical movement of the link pin 34.

The link pin 34 faces the outside of the regulation cylinder 4c through an oval window formed in the left side surface of the regulation cylinder 4c. The link pin 34 is pivoted on a feedback link 24 so that the link pin 34 is moved vertically and interlockingly with the angle of the input side swash plate 6.

Accordingly, with regard to the hydraulic servo mechanism 3, the output part 3a and the regulation part 3b are separated and interlocked with each other through the feedback link 24, whereby the degree of freedom of the layout of the hydraulic servo mechanism 3 is improved.

With regard to the hydraulic stepless transmission 1 constructed so that the movable swash plate of the hydraulic pump or hydraulic motor of plunger type and variable capacity type (the input side swash plate 6) is slanted by the hydraulic servo mechanism 3, the hydraulic servo mechanism 3 comprises the power piston 15 connected to one of the ends of the input side swash plate 6 which slantingly drives it, the servo spool 13 arranged perpendicularly to the slide direction of the power piston 15 and substantially parallel to the surface of the input side swash plate 6, and the feedback link 24 connecting the servo spool 13 to the input side swash plate 6.

Accordingly, the distance between the servo spool 13 and the input side swash plate 6 is reduced as much as possible and the power piston 15 is arranged perpendicularly thereto and above them, whereby the hydraulic stepless transmission 1 is miniaturized. The hydraulic servo mechanism 3 is arranged above the bearing housing part 4a and the feedback link 24 is arranged at the side of the bearing housing part 4a so that the attachment work of the bearing housing part 4a to the hydraulic stepless transmission 1 can be performed easily. The feed back mechanism is simplified.

Explanation will be given on the swash plate holding member 5 in detail referring to FIGS. 1 and 2.

As shown in FIGS. 1 and 2, the swash plate holding member 5 is disposed behind the bearing housing part 4a and supports the input side swash plate 6 so that the slant angle of a swash plate surface 6a of the input side swash plate 6 (the angle between the swash plate surface 6a and the axis of the input shaft 2). A hole is bored at the substantial center of the swash plate holding member 5. The swash plate holding member 5 is fixed to the bearing housing part 4a by screwing bolts.

The rear end of the swash plate holding member 5 (holding part 5a) is shaped to be a substantial half-circular hollow. A swash plate metal bearing 28 is fixed to the half-circular hollow by a spring pin or the like.

Explanation will be given on the input side swash plate 6 in detail referring to FIGS. 1, 2 and 22.

As shown in FIGS. 1, 2 and 22, the input side swash plate 6 converts the rotary driving power of the input shaft 2 to the power of the reciprocal movement of the input side plungers 8 (that is, by hydraulic pressure of pressurized oil in the hydraulic circuit formed in the cylinder block 7), and varies the slant angle of the swash plate surface 6a so as to vary the stroke of the input side plungers 8 at the time of reciprocating (that is, by varying the amount of pressurized oil pressingly sent by the input side plungers 8 at the time of reciprocating). A hole penetrated by the input shaft 2 is bored at the substantial center of the input side swash plate 6, and the swash plate surface 6a which is a flat plate surface is formed at one of the sides of the input side swash plate 6.

The projected end of the input side plungers 8 (touching plate 8c) touches (or is engaged with) the swash plate surface 6a. On the other hand, a holding part 6b is projectingly provided on the other plate surface. The shape of the holding part 6b corresponds to the half-circular hollow of the holding part 5a of the swash plate holding member 5. The input side swash plate 6 is rotated while the holding part 6b touches the holding part 5a of the swash plate holding member 5 (more strictly, the swash plate metal bearing 28 is provided in the hollow half-circular shaped when viewed in side) so as to change the slant angle of the swash plate surface 6a (the angle between the swash plate surface 6a and the axis of the input shaft 2).

The diameter of the hole bored at the substantial center of the input side swash plate 6 is set so that the input shaft 2 does not interfere with the rotated input side swash plate 6.

Explanation will be given on the cylinder block 7 which is an embodiment of the cylinder block of the hydraulic apparatus according to the present invention and is the principal part of the present invention referring to FIGS. 1, 2 and 5 to 8.

As shown in FIGS. 1, 2 and 5, the cylinder block 7 is substantially cylindrical. A through-hole 7c penetrated by the input shaft 2 is bored at the substantial center of the cylinder block 7 from an input side end surface 7a to an output side end surface 7b. The front end of the inner peripheral surface of the through-hole 7c (the end at the side of the input side end surface 7a) is spline-processed. The part of the outer peripheral surface of the input shaft 2 corresponding to the spline-processed part of the cylinder block 7 at the time of inserting the input shaft 2 into the cylinder block 7 is also spline-processed. Accordingly, the cylinder block 7 is spline-fitted with the input shaft 2 so as to be rotated integrally with the input shaft 2.

The input side end surface 7a faces the input side swash plate 6, and the output side end surface 7b faces the output side swash plate 12. Each of the input side end surface 7a and the output side end surface 7b is perpendicular to the axis of the input shaft 2.

As shown in FIGS. 6 to 8, seven input side plunger holes 31 and seven input side timing spool holes 32 are bored in the cylinder block 7 from the input side end surface 7a of the cylinder block 7 toward the axis of the input shaft 2.

The input side plunger holes 31 are bored in the cylinder block 7 so as to house the input side plungers 8, and the length direction of each of the input side plunger holes 31 is parallel to the axis of the input shaft 2. Each of the input side plunger holes 31 does not reach the output side end surface 7b and reaches the position a little toward the output side end surface 7b from the middle between the input side end surface 7a and the output side end surface 7b.

The input side timing spool holes 32 are bored in the cylinder block 7 so as to house the input side timing spools 9, and the length direction of each of the input side timing spool holes 32 is parallel to the axis of the input shaft 2. Each of the input side timing spool holes 32 reaches the output side end surface 7b.

As shown in FIG. 6, the distance between each of the input side plunger holes 31 and the through-hole 7c into which the input shaft 2 is inserted when viewed along the axis of the input shaft 2 is fixed (that is, the input side plunger holes 31 are arranged on the same circle), and the distance between each of the two adjacent input side plunger holes 31 is fixed (that is, the angle between the two adjacent input side plunger holes 31 about the axis of the through-hole 7c is fixed).

The distance between each of the input side timing spool holes 32 and the through-hole 7c into which the input shaft 2 is inserted when viewed along the axis of the input shaft 2 is also fixed (that is, the input side timing spool holes 32 are arranged on the same circle), and the distance between each of the two adjacent input side timing spool holes 32 is fixed (that is, the angle between the two adjacent input side timing spool holes 32 about the axis of the through-hole 7c is fixed). Each of the input side timing spool holes 32 is closer to the through-hole 7c than each of the input side plunger holes 31, and the distance between each of the input side timing spool holes 32 and the input side plunger holes 31 is equal to the distance between each of the input side timing spool holes 32 and a later-discussed output side plunger hole 41 adjacent to the input side timing spool hole 32. Then, the center of each of the input side timing spool holes 32 is arranged on a line segment passing through the center of the through-hole 7c, and each of the input side plunger holes 31 and the adjacent output side plunger hole 41 is asymmetric about the line segment.

As shown in FIGS. 6 to 8, seven pairs of the input side plunger holes 31 and the adjacent input side timing spool holes 32 are provided, and the input side plunger hole 31 and the input side timing spool hole 32 of each of the pairs are communicated with each other through a communication hole 33.

Each of the communication holes 33 is bored at the substantial center of the cylinder block 7 in the axial direction of the input shaft 2 and communicates the axes of the input side plunger holes 31 and the adjacent input side timing spool holes 32 with each other by the shortest distance and is slanted in the diametral direction. In this embodiment, the cylinder block 7 is formed by casting and the communication holes 33 are formed by a shell core at the time of the casting. Accordingly, the number of the machining processes is reduced, and processing a plug for closing an end of a bored hole and a rib for processing the plug are omitted, whereby the number of parts is reduced and the weight of the cylinder block is reduced.

The cylinder block 7 is constructed so that the input side plunger holes 31, the output side plunger holes 41, the timing spool holes 32 and 42, and the oil passages connected to the plunger holes 31 and 41 are formed by casting with the shell core.

Accordingly, the boring process or the like is omitted, and a plug required for closing the end of the bored hole is omitted so as to reduce the number of parts, whereby the cost of the cylinder block 7 is reduced.

The rib required for processing the plug of the end of the bored hole is omitted so as to reduce the size and weight of the cylinder block 7.

An inner diameter of a confluent part 36 of the communication holes 33 and the input side plunger holes 31 is larger than the inner diameter of each of the input side timing spool holes 32. Accordingly, when the input side plunger holes 31 are shut off from an input side oil chamber 35 and an output side oil chamber 45 by diameter enlarged portions 9a of the input side timing spools 9 (in the neutral position), hydraulic pressure is applied equally on the outer perimeters of the diameter enlarged portions 9a so as to prevent the input side timing spools 9 from being pushed along a certain circumferential direction in the input side timing spool holes 32.

As shown in FIGS. 6 to 8, the seven output side plunger holes 41 and the seven output side timing spool holes 42 are provided from the output side end surface 7b of the cylinder block 7 along the axis of the input shaft 2.

Each of the output side plunger holes 41 is bored in the cylinder block 7 so as to house the output side plungers 10, and the longer direction of each of the output side plunger holes 41 is parallel to the axis of the input shaft 2. Each of the output side plunger holes 41 does not reach the output side end surface 7b and reaches the position a little toward the output side end surface 7b from the middle between the input side end surface 7a and the output side end surface 7b.

The output side timing spool holes 42 are bored in the cylinder block 7 so as to house the output side timing spools 11, and the length direction of each of the output side timing spool holes 42 is parallel to the axis of the input shaft 2. Each of the output side timing spool holes 42 reaches the output side end surface 7b.

As shown in FIG. 6, the distance between each of the output side plunger holes 41 and the through-hole 7c into which the input shaft 2 is inserted when viewed along the axis of the input shaft 2 is fixed (that is, the output side plunger holes 41 are arranged on the same circle), and the distance between each of the two adjacent output side plunger holes 41 is fixed (that is, the angle between the two adjacent output side plunger holes 41 about the axis of the through-hole 7c is fixed).

The distance between each of the output side timing spool holes 42 and the through-hole 7c into which the input shaft 2 is inserted when viewed along the axis of the input shaft 2 is also fixed (that is, the output side timing spool holes 42 are arranged on the same circle), and the distance between each of the two adjacent input side timing spool holes 32 is fixed (that is, the angle between the two adjacent output side timing spool holes 42 about the axis of the through-hole 7c is fixed). Each of the output side timing spool holes 42 is closer to the through-hole 7c than each of the output side plunger holes 41, and the distance between each of the output side timing spool holes 42 and the output side plunger holes 41 is equal to the distance between each of the output side timing spool holes 42 and the input side plunger hole 31 adjacent to the output side timing spool hole 42. Then, the center of each of the output side timing spool holes 42 is arranged on a line segment passing through the center of the through-hole 7c, and each of the output side plunger holes 41 and the adjacent input side plunger holes 31 is asymmetric about the line segment.

As shown in FIGS. 6 to 8, seven pairs of the output side plunger holes 41 and the adjacent output side timing spool holes 42 are provided, and the output side plunger hole 41 and the output side timing spool hole 42 of each of the pairs are communicated with each other through a communication hole 43.

Each of the communication holes 43 is bored at the substantial center of the cylinder block 7 in the axial direction of the input shaft 2 and communicates the axes of the output side plunger holes 41 and the adjacent output side timing spool holes 42 with each other by the shortest distance and is slanted in the diametral direction. In this embodiment, similar to the communication holes 33, the communication holes 43 are formed by a shell core at the time of the casting.

An inner diameter of a confluent part 46 of the communication holes 43 and the output side plunger holes 41 is larger than the inner diameter of each of the output side timing spool holes 42. Accordingly, when the output side plunger holes 41 are shut off from an input side oil chamber 35 and an output side oil chamber 45 by diameter enlarged portions 11a of the output side timing spools 11 (in the neutral position), hydraulic pressure is applied equally on the outer perimeters of the diameter enlarged portions 11a so as to prevent the output side timing spools 11 from being pushed along a certain circumferential direction in the output side timing spool holes 42.

As shown in FIGS. 6 to 8, the input side plunger holes 31 and the output side plunger holes 41 are adjacent to each other alternately at regular intervals when viewed along the axis of the input shaft 2 (that is, the plunger holes are arranged on a circle centering on the through-hole 7c in the order of the input side plunger hole 31, the output side plunger hole 41, the input side plunger hole 31, the output side plunger hole 41, and the like).

Similarly, the input side timing spool holes 32 and the output side timing spool holes 42 are adjacent to each other alternately at regular intervals when viewed along the axis of the input shaft 2 (that is, the plunger holes are arranged on a circle centering on the through-hole 7c in the order of the input side timing spool hole 32, the output side timing spool hole 42, the input side timing spool hole 32, the output side timing spool hole 42, and the like). The input side timing spool hole 32 or the output side timing spool hole 42 is arranged between the input side plunger hole 31 and the output side plunger hole 41 at the side of the center of the cylinder block 7 (at the side of the through-hole 7c).

As shown in FIGS. 7 and 8, two inner peripheral grooves comprising a first inner peripheral groove and a second inner peripheral groove are formed in the inner peripheral surface of the side of the through-hole 7c of the cylinder block 7. Each of the inner peripheral grooves is ring-shaped along the peripheral direction of the inner peripheral surface and is communicated with the input side timing spool holes 32 and the output side timing spool holes 42.

A space surrounded by the first inner peripheral groove and close to the input side end surface 7a and the outer peripheral surface of the input shaft 2 is referred to as the input side oil chamber 35, and a space surrounded by the second inner peripheral groove close to the output side end surface 7b and the outer peripheral surface of the input shaft 2 is referred to as the output side oil chamber 45.

In this embodiment, the number of each of the input side plungers 8, the input side timing spools 9, the output side plungers 10 and the output side timing spools 11 housed in the cylinder block 7 is seven. However, the number is not limited thereto and a plurality of each of the plungers 8 and 10, and timing spools 9 and 11 brings similar effect.

With regard to the hydraulic stepless transmission 1 in which the cylinder block 7 housing the input side plungers 8, the input side timing spools 9, the output side plungers 10 and the output side timing spools 11 in parallel to the axis slidably, the input side swash plate 6 touching the tips of the input side plungers 8, and the output side swash plate 12 opposite to the input side swash plate 6 and touching the output side plungers 10 are arranged on the input shaft 2, a plurality of the plunger holes 31 and 41 respectively housing the input side plungers 8 and the output side plungers 10 are arranged alternately on the same radius of the cylinder block 7, and the timing spool holes 32 and 42 are arranged between the input side plunger holes 31 and the output side plunger holes 41 at the side of the center.

Accordingly, the cylinder block 7 is miniaturized while the distance between the plunger holes 31 and 41 housing the plungers 8 and 10 and the timing spool holes 32 and 42 housing the timing spools 9 and 11 is secured. In the case the outside dimension of the cylinder block 7 is not changed, the caliber of each of the plunger holes 31 and 41 housing the plungers 8 and 10 and the timing spool holes 32 and 42 housing the timing spools 9 and 11 can be increased so as to make the processing of the holes easy.

Explanation will be given on the input side plungers 8 which are an embodiment of the first plungers of the hydraulic apparatus according to the present invention and the output side plungers 10 which are an embodiment of the second plungers of the hydraulic apparatus according to the present invention in detail referring to FIGS. 1, 2, 6 and 7.

In this embodiment, the shape of the input side plungers 8 is the same as that of the output side plungers 10 for the sake of using common parts. However, the shape of the plungers is not limited thereto and the shape and number of the input side plungers 8 may differ from those of the output side plungers 10 corresponding to the capacity of the pump or the motor.

As shown in FIGS. 1 and 2, the input side plungers 8 convert the rotary driving power of the input shaft 2 to pressure of hydraulic oil in the hydraulic circuit formed in the cylinder block 7. The output side plungers 10 convert the pressure of hydraulic oil in the hydraulic circuit formed in the cylinder block 7 to the rotary driving power of the output side swash plate 12.

As shown in FIGS. 1, 6 and 7, the input side plungers 8 are housed in the input side plunger holes 31 and the output side plungers 10 are housed in the output side plunger holes 41.

As shown in FIG. 1, each of the output side plungers 10 mainly comprises a plunger part 10a, a ball 10b and a touching plate 10c.

The plunger part 10a is substantially cylindrical and slidably and reciprocally touches the output side plunger hole 41 of the cylinder block 7. The ball 10b is substantially spherical and fixed integrally to the touching plate 10c which is substantially discoid. The touching plate 10c is slidably connected through the ball 10b to the projected end (the end projected from the output side end surface 7b toward the output side swash plate 12) of the plunger part 10a, and the projected end of the plunger part 10a is blocked by the ball 10b (more strictly, a lubricating oil passage is bored in each of the ball 10b and the touching plate 10c, and pressurized oil in the output side plunger hole 41 is leaked little by little through the lubricating oil passage to the touching surface of the touching plate 10c and the output side swash plate 12 so as to lubricate the touching surface).

A spring pressing member 29 and a spring 30 are housed in the plunger part 10a. One of ends of the spring 30 touches the spring pressing member 29, and the other end is projected from the opened end of the plunger part 10a and touches the bottom wall surface of the output side plunger hole 41. Then, the spring 30 biases the output side plunger 10 so as to be projected from the output side end surface 7b of the cylinder block 7 (that is, so that the touching plate 10c touches a swash plate surface 12a of the output side swash plate 12).

Each of the input side plungers 8 also mainly comprises a plunger part, a ball and a touching plate, and is constructed similarly to the output side plunger 10. A spring pressing member and a spring are housed in the plunger part. One of ends of the spring touches the spring pressing member, and the other end is projected from the opened end of the plunger part and touches the bottom wall surface of the input side plunger hole 31. Then, the spring biases the input side plunger 8 so as to be projected from the input side end surface 7a of the cylinder block 7 (that is, so that the touching plate touches the swash plate surface 6a of the input side swash plate 6).

Explanation will be given on the input side timing spools 9 which are an embodiment of the first spools of the hydraulic apparatus according to the present invention and the output side timing spools 11 which are an embodiment of the second spools of the hydraulic apparatus according to the present invention in detail referring to FIGS. 1 and 9 to 12.

In this embodiment, as shown in FIG. 9, the shape of the input side timing spools 9 is the same as that of the output side timing spools 11 for the sake of using common parts. However, the shape of the plungers is not limited thereto and the shape and number of the input side timing spools 9 may differ from those of the output side timing spools 11.

As shown in FIGS. 9 and 10, the input side timing spools 9 switch the passage of pressurized oil communicated with the input side plunger holes 31 in which the input side plungers 8 are housed. Each of the input side timing spools 9 has substantial cylindrical members of different outer diameters and mainly comprises the diameter enlarged portion 9a, diameter enlarged portions 9b, valve stems 9c and an engagement part 9d.

The diameter enlarged portion 9a and the diameter enlarged portions 9b are substantially cylindrical and the outer diameter thereof is substantially the same as the inner diameter of the input side timing spool holes 32 formed in the cylinder block 7. Then, the diameter enlarged portion 9a and the diameter enlarged portions 9b slidably and reciprocally touch the input side timing spool holes 32 air-tightly. Grooves are formed on the outer peripheral surface of each of the diameter enlarged portions 9b.

The diameter enlarged portion 9a is arranged at the middle (or the substantial center) of the input side timing spools 9 in the longer direction (the direction of reciprocal movement). The diameter enlarged portions 9b are arranged respectively at the ends of the input side timing spools 9 in the longer direction.

The valve stems 9c are substantially cylindrical and the outer diameter thereof is smaller than those of the diameter enlarged portion 9a and the diameter enlarged portions 9b. The valve stems 9c are arranged between the diameter enlarged portion 9a and the diameter enlarged portions 9b.

The engagement part 9d is projectingly provided from one of the diameter enlarged portions 9b along the longer direction of the input side timing spools 9. The connection part of the engagement part 9d and the diameter enlarged portion 9b is constricted and engaged with the input side spool cam 37.

In this embodiment, the engagement part 9d is substantially biconic when viewed in cross-section so that contact surface pressure of the engagement part between the engagement part 9d and a groove 37a of the input side spool cam 37 is reduced and manufacturability of the engagement part 9d is improved. The engagement part 9d may alternatively be substantially arcuate when viewed in cross-section.

As shown in FIGS. 11 and 12, each of the input side timing spools 9 is slidably inserted into the input side timing spool hole 32 so that the engagement part 9d is projected from the input side end surface 7a of the cylinder block 7.

The diameter enlarged portion 9b connected to the engagement part 9d is always positioned at the side of the input side end surface 7a near the communication part between the input side oil chamber 35 and the input side timing spool hole 32 formed by the first groove when the input side timing spool 9 is reciprocated in the input side timing spool hole 32. The diameter enlarged portion 9b further from the engagement part 9d is always positioned at the side of the output side end surface 7b near the communication part between the output side oil chamber 45 and the input side timing spool hole 32 formed by the first groove when the input side timing spool 9 is reciprocated in the input side timing spool hole 32.

The diameter enlarged portion 9a is arranged at the position corresponding to the confluent part 36 of the communication oil passage communicating the input side plunger holes 31 with the input side timing spool holes 32 (the communication holes 33) and the input side timing spool holes 32. The inner diameter of the confluent part 36 is larger than the outer diameter of the diameter enlarged portion 9a. The length of the confluent part 36 and the length of the diameter enlarged portion 9a are substantially the same in the longer direction (the direction of reciprocal movement) of the input side timing spool 9.

Then, as shown in FIG. 12, by sliding the input side timing spool 9 in the input side timing spool holes 32, the diameter enlarged portion 9a can be positioned in one of the three positions, (1) the position in which the input side oil chamber 35 is shut off from the input side plunger holes 31 and the output side oil chamber 45 is communicated with the input side plunger holes 31, (2) the position in which each of the input side oil chamber 35 and the output side oil chamber 45 is shut off from the input side plunger holes 31, and (3) the position in which the input side oil chamber 35 is communicated with the input side plunger holes 31 and the output side oil chamber 45 is shut off from the input side plunger holes 31.

As shown in FIGS. 9 and 10, notches 9e are formed at the shoulders of the cylindrical shape of the diameter enlarged portion 9a of the input side timing spool 9 at the sides of the input side oil chamber 35 and the output side oil chamber 45 (at the sides of high pressure and low pressure).

The shape of the notches 9e is not limited.

Accordingly, when the input side plunger holes 31 are communicated with the input side oil chamber 35 or the output side oil chamber 45, a minute passage of pressurized oil is formed at the initial time of switching the oil passage so as to suppress pulsation caused by sudden variation of pressure in the oil passage. Then, noise generated by actuation of the input side timing spools 9 is reduced.

The relation between the length of the confluent part 36 and the length of the diameter enlarged portion 9a in the longer direction of the input side timing spool 9 is suitably selected corresponding to the driving characteristic of the hydraulic apparatus according to the present invention and is not limited to the case in this embodiment that the length of the confluent part 36 and the length of the diameter enlarged portion 9a in the longer direction of the input side timing spool 9 are substantially the same. In the longer direction of the input side timing spool 9, the confluent part 36 may be longer or shorter than the diameter enlarged portion 9a.

Explanation will be given on the input side spool cam 37, which is the principal part of the present invention, in detail referring to FIGS. 1, 3 and 12 to 17.

As shown in FIGS. 12 to 17, the input side spool cam 37 is a cylindrical cam substantially ring-shaped, and the groove 37a which is substantially arcuate when viewed in cross-section is formed in the outer peripheral surface of the ring.

Two width across flat recesses 37b parallel to each other are formed at the side of the inner peripheral surface of the input side spool cam 37 and are engaged with two width across flat projections 4s parallel to each other and formed in a boss 4r of the input side housing 4 shown in FIGS. 3 and 4, whereby the input side spool cam 37 is pivoted so as not to be rotatable relatively.

Accordingly, as shown in FIG. 1, the input side spool cam 37 is pivoted easily by the input side housing 4 so as not to be rotatable relatively, whereby the phase of actuation of the cylinder block 7 is certainly in agreement with that of the input side spool cam 37.

As shown in FIGS. 12 to 17, a third recess 37c different from the width across flat recesses 37b is formed at the side of the inner peripheral surface of the input side spool cam 37 for preventing error in assembly. The recess 37c is engaged with a third projection 4t formed in the boss 4r of the input side housing 4 shown in FIGS. 3 and 4.

Accordingly, the engaging direction of the input side spool cam 37 and the input side housing 4 is fixed so as to prevent error in assembly such as a case that the phase is different from 180°.

As shown in FIGS. 12 to 17, the groove 37a is formed to be one amplitude of a continuous sine wave. The groove 37a is engaged with the engagement part 9d so that each of the input side timing spools 9 is slidingly reciprocated once in the input side timing spool hole 32 while the input side timing spool 9 makes one revolution along the groove 37a on the outer perimeter of the input side spool cam 37.

As shown in FIG. 17, the cross-sectional shape of the engagement part 9d is biconic and the engaged portion thereof is arcuate or curved. The cross-sectional shape of the groove 37a is also arcuate so that the side surface thereof is expanded toward the inner side of the groove. Accordingly, contact surface pressure at the contact between the engagement part 9d and the groove 37a which is substantially arcuate when viewed in cross-section is reduced, whereby the input side timing spools 9 are driven smoothly.

Explanation will be given on the output side timing spools 11, which are an embodiment of the second spools of the hydraulic apparatus according to the present invention, in detail referring to FIGS. 1 and 9 to 12.

As shown in FIGS. 9 and 10, the output side timing spools 11 switch the passage of pressurized oil communicated with the output side plunger holes 41 in which the output side plungers 10 are housed. Each of the output side timing spools 11 has substantial cylindrical members of different outer diameters and mainly comprises the diameter enlarged portion 11a, diameter enlarged portions 11b, valve stems 11c and an engagement part 11d.

The diameter enlarged portion 11a and the diameter enlarged portions 11b are substantially cylindrical and the outer diameter thereof is substantially the same as the inner diameter of the output side timing spool holes 42 formed in the cylinder block 7. Then, the diameter enlarged portion 11a and the diameter enlarged portions 11b slidably and reciprocally touch the output side timing spool holes 42 air-tightly.

The diameter enlarged portion 11a is arranged at the middle (or the substantial center) of the output side timing spool 11 in the longer direction (the direction of reciprocal movement). The diameter enlarged portions 11b are arranged respectively at the ends of the output side timing spool 11 in the longer direction.

The valve stems 11c are substantially cylindrical and the outer diameter thereof is smaller than those of the diameter enlarged portion 11a and the diameter enlarged portions 11b. The valve stems 11c are arranged between the diameter enlarged portion 11a and the diameter enlarged portions 11b.

The engagement part 11d is projectingly provided from one of the diameter enlarged portions 11b along the longer direction of the output side timing spool 11. The connection part of the engagement part 11*d* and the diameter enlarged portion 11*b* is constricted and engaged with the output side spool cam 47.

In this embodiment, similar to the input side timing spools 9, the engagement part 11*d* is substantially biconic when viewed in cross-section so that contact surface pressure of the engagement part between the engagement part 11*d* and the output side spool cam 47 is reduced. The engagement part 11*d* may alternatively be substantially arcuate when viewed in cross-section.

Namely, each of the engagement parts 9*d* and 11*d* provided at the tips of the input side timing spool 9 and the output side timing spool 11 is straight when viewed in cross-section so that the processing of the engagement parts 9*d* and 11*d* is easy. The input side timing spool 9 and the output side timing spool 11 slide smoothly.

As shown in FIG. 11, each of the output side timing spools 11 is slidably inserted into the output side timing spool hole 42 so that the engagement part 11*d* is projected from the output side end surface 7*b* of the cylinder block 7.

The diameter enlarged portion 11*b* connected to the engagement part 11*d* is always positioned at the side of the output side end surface 7*b* near the communication part between the output side oil chamber 45 and the output side timing spool hole 42 formed by the second groove when the output side timing spool 11 is reciprocated in the output side timing spool hole 42. The diameter enlarged portion 9*b* further from the engagement part 11*d* is always positioned at the side of the output side end surface 7*b* near the communication part between the output side oil chamber 45 and the output side timing spool hole 42 formed by the first groove when the output side timing spool 11 is reciprocated in the output side timing spool hole 42.

The diameter enlarged portion 11*a* is arranged at the position corresponding to the confluent part 46 of the communication oil passage communicating the output side plunger holes 41 with the output side timing spool holes 42 (the communication holes 43) and the output side timing spool holes 42. The inner diameter of the confluent part 46 is larger than the outer diameter of the diameter enlarged portion 11*a*. The length of the confluent part 46 and the length of the diameter enlarged portion 11*a* are substantially the same in the longer direction (the direction of reciprocal movement) of the output side timing spool 11.

Then, as shown in FIG. 12, by sliding the input side timing spool 9 in the output side timing spool holes 42, the diameter enlarged portion 9*a* can be positioned in one of the three positions, (1) the position in which the input side oil chamber 35 is shut off from the output side plunger holes 41 and the output side oil chamber 45 is communicated with the output side plunger holes 41, (2) the position in which each of the input side oil chamber 35 and the output side oil chamber 45 is shut off from the output side plunger holes 41, and (3) the position in which the input side oil chamber 35 is communicated with the output side plunger holes 41 and the output side oil chamber 45 is shut off from the output side plunger holes 41.

As shown in FIGS. 9 and 10, similar to the diameter enlarged portion 9*a* of the input side timing spool 9, notches 11*e* are formed at the shoulders of the cylindrical shape of the diameter enlarged portion 11*a* of the output side timing spool 11. Accordingly, noise generated by actuation of the output side timing spools 11 is reduced.

The relation between the length of the confluent part 46 and the length of the diameter enlarged portion 11*a* in the longer direction of the output side timing spool 11 is suitably selected corresponding to the driving characteristic of the hydraulic apparatus according to the present invention and is not limited to the case in this embodiment that the length of the confluent part 46 and the length of the diameter enlarged portion 11*a* in the longer direction of the output side timing spool 11 are substantially the same. In the longer direction of the output side timing spool 11, the confluent part 46 may be longer or shorter than the diameter enlarged portion 11*a*.

Explanation will be given on the output side spool cam 47, which is the principal part of the present invention, in detail referring to FIGS. 1, 3 and 12 to 17.

As shown in FIGS. 12 to 17, the output side spool cam 47 is a cylindrical cam substantially ring-shaped, and the groove 47*a* which is substantially arcuate when viewed in cross-section is formed in the outer peripheral surface of the ring.

Similar to the input side spool cam 37, two width across flat recesses 47*b* parallel to each other are formed at the side of the inner peripheral surface of the output side spool cam 47 and are engaged with two width across flat projections 12*d* parallel to each other and formed at a front end of a holding part 12*b* of the output side swash plate 12, whereby the input side spool cam 47 is pivoted so as not to be rotatable relatively.

Accordingly, as shown in FIG. 1, the output side spool cam 47 is pivoted easily by the output side swash plate 12 so as not to be rotatable relatively, whereby the phase of actuation of the cylinder block 7 is certainly in agreement with that of the output side spool cam 47.

The width across flat projections 4*m* and 12*d* are respectively formed on the inner surfaces of the pivoted parts of the input side housing 4 and the output side swash plate 12. The width across flat recesses 37*b* and 47*b* are respectively formed in the outer surfaces of the pivoted parts of the spool cams 37 and 47. The projections 4*m* and 12*b* are respectively engaged with the recesses 37*b* and 47*b* so that the input side housing 4 and the input side swash plate 12 are respectively fixed to the spool cams 37 and 47 so as not to be rotatable relatively. Accordingly, the phase of the cylinder block 7 is certainly in agreement with those of the timing spools 9 and 11, whereby the timing of switching the oil passage is secured certainly. The assembly work is made easy.

As shown in FIGS. 12 to 17, a third recess 47*c* different from the width across flat recesses 47*b* is formed at the side of the inner peripheral surface of the output side spool cam 47 for preventing error in assembly. The recess 47*c* is engaged with a third projection 12*e* formed in the front end of the holding part 12*b* of the output side swash plate 12.

Accordingly, the engaging direction of the output side spool cam 47 and the output side swash plate 12 is fixed so as to prevent error in assembly such as a case that the phase is different from 180°.

The third projections 4*n* and 12*e* different from the width across flat projections 4*m* and 12*d* are respectively formed on the inner surfaces of the pivoted parts of the input side housing 4 and the output side swash plate 12, and the third recesses 37*c* and 47*c* different from the width across flat recesses 37*b* and 47*b* are respectively formed in the outer surfaces of the pivoted parts of the spool cams 37 and 47. The third projections 4*n* and 12*e* are respectively engaged with the third recesses 37*c* and 47*c* so that the input side housing 4 and the output side swash plate 12 are respectively fixed to the spool cams 37 and 47 so as not to be rotatable relatively. Accordingly, error in assembly of the hydraulic stepless transmission 1 is prevented, and the assembly work is made easy.

As shown in FIGS. 12 to 17, the groove 47*a* is formed to be one set of amplitude of a continuous sine wave. The groove 47*a* is engaged with the engagement part 11*d* so that each of the output side timing spools 11 is slidingly reciprocated once in the output side timing spool hole 42 while the output side timing spool 11 makes one revolution along the groove 47*a* on the outer perimeter of the output side spool cam 47.

In this case, the contact surface pressure of the engagement part between the engagement part 11*d* and the groove 47*a* which is substantially arcuate when viewed in cross-section is reduced, whereby the output side timing spool 11 is driven smoothly.

With regard to the hydraulic stepless transmission 1 constructed so that the cylinder block 7 housing the input side plungers 8, the input side timing spools 9, the output side plungers 10 and the output side timing spools 11 in parallel to the axis slidably, the input side swash plate 6 touching the tips of the input side plungers 8, and the output side swash plate 12 opposite to the input side swash plate 6 and touching the output side plungers 10 are arranged on the input shaft 2, the grooves 37*a* and 47*a* respectively engaged with the ends of the timing spools 9 and 11 are respectively provided in the spool cams 37 and 47 fixed to the input side housing 4 and the output side swash plate 12, and the touching part of either the groove 37*a* or 47*a* and the corresponding engagement part 9*d* or 11*d* provided at the tip of the timing spool 9 or 11 is arcuate when viewed in cross-section. Accordingly, the timing spools 9 and 11 are prevented from seizing, and the timing spools 9 and 11 are slid smoothly.

Explanation will be given on the output side swash plate 12, which is the second swash plate and is the principal part of the present invention, in detail referring to FIGS. 1, 2 and 18 to 20.

The output side swash plate 12 converts the power of the reciprocal movement of the output side plungers 10 (that is, the pressure of hydraulic oil in the hydraulic circuit formed in the cylinder block 7) to the rotary driving power of an output shaft or the like.

As shown in FIGS. 1 and 18, the output side swash plate 12 is substantially cylindrical and a through-hole penetrated by the input shaft 2 is provided therein. The swash plate surface 12*a* is provided at the front portion of the output side swash plate 12. The swash plate surface 12*a* is flat and the projected ends of the output side plungers 10 (the touching plates 10*c*) touch the swash plate surface 12*a*. The swash plate surface 12*a* is slanted about the axis of the input shaft 2 to form a fixed angle (the angle between the swash plate surface 12*a* and the axis of the input shaft 2).

As shown in FIGS. 1 and 2, the rear end of the output side swash plate 12 is fixed to an output casing 48 so that the output side swash plate 12 is rotated integrally with the output casing 48. An outer ring of an output side conical bearing 51 is engaged with the rear end of the through-hole of the output side swash plate 12, and an output side needle bearing 52 is interposed between the through-hole of the output side swash plate 12 and a spacer 50 so that the output side swash plate 12 is rotatable relatively about the input shaft 2.

As shown in FIGS. 18 to 20, in this embodiment, the output side swash plate 12 is formed by aluminum die-casting so as to reduce the weight widely. A plurality of reinforcement ribs 49 are arranged at the outer perimeter of the output side swash plate 12 so as to secure enough rigidity to stand the touching power of the output side plungers 10.

As shown in FIGS. 19 and 20, each of the reinforcement ribs 49 is parallel to the input shaft 2, and the surfaces of the reinforcement ribs 49 are parallel to each other. The reinforcement ribs 49 are not projected radially.

The distance between the reinforcement ribs 49 is substantially inversely proportional to the distance between the swash plate surface 12*a* and the surface perpendicular to the input shaft 2 (for example, the output side end surface 7*b* of the cylinder block 7).

Then, at the position comparatively close to the output side end surface 7*b* (for example, the lower side in FIG. 20), the distance between the reinforcement ribs 49 is long, and at the position far from the output side end surface 7*b* (for example, the upper side in FIG. 20), the distance between the reinforcement ribs 49 is short. In other words, the distance between the reinforcement ribs 49 is inversely proportional to the length of the output side swash plate 12 in the axial direction. The distance between the reinforcement ribs 49 is long at the part at which the length of the output side swash plate 12 in the axial direction is long, and the distance between the reinforcement ribs 49 is short at the part at which the length of the output side swash plate 12 in the axial direction is short.

With regard to the hydraulic stepless transmission 1 the cylinder block 7 housing the input side plungers 8, the input side timing spools 9, the output side plungers 10 and the output side timing spools 11 parallel to the axis slidably, the input side swash plate 6 touching the tips of the input side plungers 8, and the output side swash plate 12 opposite to the input side swash plate 6 and touching the output side plungers 10 are arranged on the input shaft 2, a plurality of the reinforcement ribs 49 are arranged at the outer perimeter of the output side swash plate 12 so as to be parallel to the input shaft 2, and the distance between the reinforcement ribs 49 corresponds to the distance between the output side swash plate 12 and the surface perpendicular to the axis. Accordingly, the weight of the output side swash plate 12 is reduced, and the input side swash plate 12 is manufactured easily.

A projection 49*a* is formed in each of the reinforcement ribs 49, and the size of the projection 49*a* is inversely proportional to the length of the output side swash plate 12 in the axial direction. The projection 49*a* is small at the part at which the length of the output side swash plate 12 in the axial direction is long, and the projection 49*a* is large at the part at which the length of the output side swash plate 12 in the axial direction is short. In this embodiment, a part projected lengthwise from the outer perimeter of the output side swash plate 12 is referred to as the projection 49*a*, and the length of each of the projections 49*a* extended from the swash plate surface 12*a* parallel to the axis is not uniform so that the size of each of the projections 49*a* is not uniform. The construction so that the size of each of the projections 49*a* is not uniform is not limited to this embodiment, and the reinforcement ribs 49 at the position longitudinally opposite to the swash plate surface 12*a* or at the longitudinal middle position may be large.

The width of each of the reinforcement ribs 49 corresponds the distance between the input side swash plate 12 and the surface perpendicular to the axis. Accordingly, the weight of the input side swash plate 12 is reduced while the compressive strength of the input side swash plate 12 in the axial direction is secured. The balance is regulated by cutting the reinforcement ribs 49 so that the balance regulation work is performed easily. The weight of each of the reinforcement ribs 49 may be changed by changing the width of the reinforcement rib 49. Namely, the width is inversely proportional to the length of the output side swash plate 12 in the axial direction, and the reinforcement rib 49 at the position at which the length in the axial direction is long is thin and the reinforcement rib 49 at the position at which the length in the axial direction is short is thick. Accordingly, the rigidity is secured efficiently, and the output side swash plate 12 is balanced with respect to the weight and the rotation.

As shown in FIG. 19, each of the reinforcement ribs 49 is projected on a surface parallel to the input shaft 2 and parallel to a slant reference surface C perpendicular to a surface including a top dead point A and a bottom dead point B on the swash plate surface 12*a*.

Accordingly, at the rapping work of casting, the output side swash plate 12 can be pulled out along a fixed direction so that the output side swash plate 12 can be formed by aluminum die-casting and the casting is performed easily.

Each of the reinforcement ribs 49 is projected on the surface parallel to the input shaft 2 and parallel to the slant reference surface of the input side swash plate 12. Accordingly, the output side swash plate 12 can be formed by aluminum die-casting and the casting is performed easily.

In this embodiment, a fixed swash plate is used as the output side swash plate 12. However, a movable swash plate may be adopted as the output side swash plate 12.

The output side swash plate 12 is not axisymmetric about the axis of the output shaft so it is necessary to regulate dynamic balance at the time of rotation (weight balance and rotation balance). The output side swash plate 12 in this embodiment comprises the reinforcement ribs 49 so that the dynamic balance can be regulated comparatively easily by cutting the reinforcement ribs 49 partially.

Explanation will be given on the check relief valves 38a and 38b in this embodiment in detail referring to FIGS. 1 and 21. In FIG. 21, a circle at the left side indicates an input side hydraulic apparatus, and a circle at the right side indicates an output side hydraulic apparatus. At the time of acceleration, pressurized oil flows clockwise in the diagram from the input side hydraulic apparatus to the input side oil chamber 35, the output side hydraulic apparatus and the output side oil chamber 45, in this order, and then returns to the input side hydraulic apparatus. At the time of deceleration, pressurized oil flows counterclockwise in the diagram from the input side hydraulic apparatus to the output side oil chamber 45, the output side hydraulic apparatus and the input side oil chamber 35, in this order.

As shown in FIGS. 1 and 21, each of the check relief valves 38a and 38b is provided on a supply route of pressurized oil actuating the corresponding plungers 8 or 10 and serves as not only a check valve preventing backflow of pressurized oil but also as a relief valve releasing pressurized oil corresponding to pressure in the hydraulic route so as to increase pressure in the hydraulic route not more than a predetermined value.

In this embodiment, the two check relief valves 38a and 38b are provided so as to be respectively communicated with the input side oil chamber 35 and the output side oil chamber 45. At the diameter enlarged portion of the input shaft 2, the two check relief valves 38a and 38b are parallel to each other and are perpendicular to the axis of the input shaft 2.

Accordingly, the hydraulic stepless transmission 1 is miniaturized, and the hydraulic route is communicated with the oil passage 2b on the axis of the input shaft 2 so as to be simplified.

In this embodiment, an outlet of pressurized oil in the case that the relief valve is actuated is connected to the oil passage 2b which is the supply route of pressurized oil (at the upstream side of the check valve). Accordingly, the supply of pressurized oil in the case that the relief valve is actuated is prevented from being insufficient, and the capacity of the charge pump 26 supplying pressurized oil may be reduced.

The explanation has been given on the entire construction of the hydraulic stepless transmission 1 according to the embodiment of the present invention.

Explanation will be given on angle adjustment actuation of the input side swash plate 6 by the hydraulic servo mechanism 3 according to an embodiment of the present invention referring to FIGS. 1 to 4 and 22 to 25.

In FIGS. 1 to 4 and 22 to 25, as mentioned above, the power piston 15 is arranged longitudinally parallel to the input shaft 2 in the upper portion of the bearing housing part 4a, and the rear end of the power piston 15 is connected to one of ends of the input side swash plate 6. The servo spool 13 and the feedback spool 14 are provided vertically at the side of the power piston 15, and the feedback spool 14 is interlockingly connected through the feedback link 24 to the input side swash plate 6.

In this construction, by controlling the proportional regulation valve 25, comprising an electromagnetic proportional valve, pressure of oil discharged from the proportional regulation valve 25 is varied so that the servo spool 13 is slid vertically. Corresponding to the position of the servo spool 13, one of three modes is selected, wherein the three modes are the first mode in which pressurized oil from the charge pump 26 is sent to the front oil chamber 17 and the rear oil chamber 18 is communicated with the pressurized oil tank 27 (position A), the second mode in which the front oil chamber 17 is communicated with the pressurized oil tank 27 and pressurized oil from the charge pump 26 is sent to the rear oil chamber 18 (position B), and the third mode in which the oil passages 4i and 4h communicated with the front oil chamber 17 and the rear oil chamber 18 are blocked (neutral position).

In each of the modes, the power piston 15 is slid longitudinally and the input side swash plate 6 is rotated interlockingly with the movement. The feedback spool 14 is moved through the feedback link 24 corresponding to the angle of the rotation.

The movement of the feedback spool 14 is transmitted through the spring member 20 to the servo spool 13 so that the feedback of the angle of the input side swash plate 6 is performed.

The input side swash plate 6 is compensated to perform fixed action corresponding to the output of the proportional regulation valve 25.

As shown in FIGS. 4 and 22, in the first mode (the mode in which the upper oil chamber 40 and the lower oil chamber 44 are communicated with each other through the second diameter reduction portion 13d and the first diameter reduction portion 13n is communicated with the connection port 4q through the oil passage 13m, that is, the servo spool 13 is at the position A), the upper oil chamber 40 is communicated with the second diameter reduction portion 13d so that pressurized oil is sent from the charge pump 26 into the front oil chamber 17 and pressurized oil in the rear oil chamber 18 is returned to the pressurized oil tank 27, whereby the power piston 15 is slid rearward.

As shown in FIG. 23, in the second mode (the mode in which the upper oil chamber 40 is communicated with the oil passage 4h through the second diameter reduction portion 13d and the lower oil chamber 44 is communicated with the connection port 4q through the third diameter reduction portion 13f and the oil passages 13p and 13m, that is, the servo spool 13 is at the position B), the upper oil chamber 40 is communicated with the oil passage 4h so that pressurized oil is sent from the charge pump 26 into the rear oil chamber 18 and pressurized oil in the front oil chamber 17 is returned to the pressurized oil tank 27, whereby the power piston 15 is slid forward.

As shown in FIG. 24, in the third mode (the mode in which each of the upper oil chamber 40 and the lower oil chamber 44 is not communicated with any oil chamber, that is, the servo spool 13 is at the neutral position), the power piston 15 is kept at the present position.

As shown in FIGS. 22 to 24, the hanging member 16 provided at the tip of the power piston 15 hangs the hanged part 6c of the input side swash plate 6. The hanged part 6c is moved substantially longitudinally corresponding to the three modes so as to drive rotatively the input side swash plate 6.

The hanged part 6c is slidable vertically along the U-like inner wall so as to absorb the vertical movement of the hanged part 6c at the time of rotating the input side swash plate 6.

According to the construction, the input side swash plate 6 is rotated reciprocally and interlockingly with the longitudinal reciprocal slide of the power piston 15.

High pressing power by the input side plungers 8 is applied on the area of the swash plate surface 6a of the input side swash plate 6 touched by the input side plungers 8 during the contraction process (pump) or the compression process (motor) (high pressure side).

On the other hand, pressing power, which is lower than the pressing power applied by the input side plungers 8 at the expansion process, is applied on the area of the swash plate surface 6a of the input side swash plate 6 touched by the input side plungers 8 during the contraction process.

With regard to the hydraulic stepless transmission 1 according to this embodiment, the left side with respect to the traveling direction is the high pressure side, and the right side is the low pressure side.

Accordingly, the hanged part 6c is offset leftward (that is, toward the high pressure side) with respect to the axis of the input shaft 2.

Then, the touching power of the input side plungers 8 is made uniform so as not to promote a moment applied on the input side swash plate 6.

Accordingly, unequal stress applied on the pivoted part of the input side swash plate 6 is reduced so as to make the rotator of the input side swash plate 6 smooth.

The power piston 15 is offset to the side touched by the input side plungers 8 with high pressure from the surface passing through the rotation axis of the cylinder block 7 housing the input side plungers 8 and is perpendicular to the rotation axis of the input side swash plate 6. Accordingly, unsuitable stress is prevented from being applied to the input side swash plate 6, and the input side swash plate 6 is rotated smoothly.

The feedback link 24 is a flat steel plate member substantially parallel to the power piston 15, and one of ends in the longer direction of the feedback link 24 is rotatably supported on a shaft 55 projected from the left side surface of bearing housing part 4a so as to construct a fulcrum of the link mechanism. A notch 24a, which is substantially U-like shaped and is opened rearward, is formed at the other end in the longer direction of the feedback link 24 and hangs a lever pin 6d projectingly provided at the left of the input side swash plate 6 so as to construct a point of effort of the link mechanism. Following the rotation of the input side swash plate 6, the distance between the fulcrum and the point of effort is varied. By making clearance in the notch 24a, the longitudinal variation of the lever pin 6d is absorbed.

The link pin 34 is pivoted at the substantial center of the feedback link 24 so as to construct a point of action of the link mechanism.

The distance between the fulcrum of the feedback link 24 and the rotation center of the input side swash plate 6 is extended as much as possible, the distance between the pivot connection part of the feedback link 24 and the input side swash plate 6 (the point of effort) and the rotation center of the input side swash plate 6 is extended as much as possible, and the distance between the fulcrum of the feedback link 24 and the pivot connection part of the feedback link 24 and the servo spool 13 (the link pin 34, the point of action) is extended as much as possible. The rotation center O of the input side swash plate 6 is arranged substantially on an extended line passing through the pivot points of the feedback link 24 (that is, the point of effort, the fulcrum and the point of action).

Accordingly, the amplitude of the point of effort can be increased as much as possible so as to improve the resolution of the regulation part 3b. The amplitude of the point of action can be increased by shortening the distance between the point of action and the point of effort as much as possible so as to improve the resolution of the regulation part 3b.

The pivot connection part of the feedback link 24 and the input side swash plate 6 and the pivot connection part of the feedback link 24 and the servo spool 13 are arranged so that the distance between the fulcrum of the feedback link 24 and the rotation center of the input side swash plate 6 is extended as much as possible, the distance between the pivot connection part of the feedback link 24 and the input side swash plate 6 and the rotation center of the input side swash plate 6 is extended as much as possible, and the distance between the fulcrum of the feedback link 24 and the pivot connection part of the feedback link 24 and the servo spool 13 is extended as much as possible. Accordingly, the resolution of the hydraulic servo mechanism 3 is improved.

According to the construction, the variation of angle of the input side swash plate 6 rotated by the power piston 15 is converted to the substantial vertical movement of the link pin 34, and corresponding to the movement, the feedback spool 14 is slid vertically.

As shown in FIG. 22, in this embodiment, when the input side swash plate 6 is rotated clockwise, the feedback spool 14 is moved upward. As shown in FIG. 23, when the input side swash plate 6 is rotated counterclockwise, the feedback spool 14 is moved downward.

By the movement of the feedback spool 14, the spring member 20 is extended or contracted so as to vary the reaction force of the spring member 20. The reaction force of the spring member 20 is applied to the servo spool 13 so that the servo spool 13 becomes stationary at the position in which the reaction force of the spring member 20 balances the oil pressure in the top oil chamber 39. Namely, the slide of the servo spool 13 is stopped at the neutral position.

By selecting the spring constant of the spring member 20 suitably, when the oil pressure balances the reaction force, the vertical position of the servo spool 13 always brings the third mode (that is, the mode shown in FIG. 24 in which each of the upper oil chamber 40 and the lower oil chamber 44 is not communicated with any oil chamber) so that the position of the power piston 15 is held, whereby the feedback mechanism is constructed.

The hydraulic servo mechanism 3 is constructed so that the feedback link 24 is substantially parallel to the power piston 15, one of the ends of the feedback link 24 is pivotally connected to the input side swash plate 6, the middle thereof is pivotally connected to the servo spool 13, and the other end thereof is pivotally connected to the input side housing 4. Accordingly, the input side swash plate 6 is slanted accurately by the power piston 15 and the servo spool 13 is slid accurately by the feedback link 24 with the simple construction, whereby the feedback mechanism with high accuracy is constructed.

In this embodiment, the rotation output of the output side swash plate 12 is increased when the power piston 15 is moved rearward and the input side swash plate 6 is rotated clockwise in FIG. 22. On the other hand, the rotation output of the output side swash plate 12 is decreased when the power piston 15 is moved forward and the input side swash plate 6 is rotated counterclockwise in FIG. 23.

The touching power applied by the input side plungers 8 at the time of rotating the output side swash plate 12 to the acceleration side is larger than the touching power applied by the input side plungers 8 at the time of rotating the output side swash plate 12 to the deceleration side so that larger driving power is required for rotating the output side swash plate 12 to the acceleration side. Then, the power piston 15 is slid rearward, that is, at the acceleration side, pressure is applied on the front oil chamber 17 at one of the sides of the power piston 15 having the larger pressure applied area, whereby the construction is in agreement with the magnitude of required driving power.

Accordingly, the diameter of the piston and the hydraulic supply pressure of the power piston 15 may be reduced.

When the power piston 15 is slid to be extended, the input side swash plate 6 is rotated so that the hydraulic stepless transmission 1 is actuated at the acceleration side, and when the power piston 15 is slid to be contracted, the input side swash plate 6 is rotated so that the hydraulic stepless transmission 1 is actuated at the deceleration side. Since larger driving power is required for rotating the input side swash plate 6 to the acceleration side, when pressure is applied on one of the sides of the power piston 15 having the larger pressure applied area (that is, pressure is applied on the front oil chamber 17 and the power piston 15 is slid to be extended) the input side swash plate 6 is rotated to the acceleration side, whereby the diameter of the piston and the hydraulic supply pressure may be reduced.

The explanation has been given on the angle regulation actuation of the input side swash plate 6 by the hydraulic servo mechanism 3 according to the embodiment of the present invention.

INDUSTRIAL APPLICABILITY

The present invention is adoptable not only to a vehicle such as a motorcar or agricultural working vehicle but also to industrial equipment or the like.

The invention claimed is:
1. A hydraulic apparatus comprising:
a movable swash plate of a hydraulic pump or motor having a plunger and having a variable capacity; and
a hydraulic servo mechanism configured to slant the movable swash plate, the hydraulic servo mechanism comprising:
a slanting piston connected to one end of the movable swash plate and configured to slantingly drive the movable swash plate;
a servo spool arranged perpendicularly to a slide direction of the slanting piston and substantially parallel to the movable swash plate;
a feedback link connecting the servo spool to the movable swash plate; and
a casing housing the slanting piston and the servo spool, wherein:
the feedback link is substantially parallel to the slanting piston,
one end portion of the feedback link is pivotally connected to the movable swash plate,
a middle portion of the feedback link is pivotally connected to the servo spool, and
another end portion of the feedback link is pivotally connected to the casing.
2. The hydraulic apparatus as set forth in claim 1, wherein:
the end portion of the feedback link pivotally connected to the movable swash plate serves as a point of effort of the feedback link,
the middle portion of the feedback link pivotally connected to the servo spool serves as a point of action of the feedback link,
the end portion of the feedback link pivotally connected to the casing serves as a fulcrum of the feedback link, and
the point of effort of the feedback link and the point of action of the feedback link are arranged so as to have:
a maximum distance between the fulcrum of the feedback link and a rotation center of the movable swash plate,
a maximum distance between the point of effort of the feedback link and the rotation center of the movable swash plate, and
a maximum distance between the fulcrum of the feedback link and the point of action of the feedback link.
3. The hydraulic apparatus as set forth in claim 1, further comprising:
a cylinder block housing the plunger; and
a plane including a rotation axis of the cylinder block and arranged perpendicular to a rotation axis of the movable swash plate,
wherein the cylinder block has a higher-pressure side portion on one side of the plane and has a lower-pressure side portion on another side of the plane so that the plunger abuts against the movable swash plate with a higher pressure when disposed in the higher-pressure side portion rather than when disposed in the lower-pressure side portion, and
wherein the slanting piston is offset to the higher pressure side portion.
4. The hydraulic apparatus as set forth in claim 1, wherein the slanting piston includes a cylinder rod.
5. The hydraulic apparatus as set forth in claim 1, wherein:
when the slanting piston is slid to be extended, the movable swash plate is rotated so that the hydraulic apparatus is actuated at an acceleration side, and
when the slanting piston is slid to be contracted, the movable swash plate is rotated so that the hydraulic apparatus is actuated at a deceleration side.
6. The hydraulic apparatus as set forth in claim 1, further comprising:
an input shaft;
a cylinder block provided on the input shaft so as to have a common rotary axis with the input shaft;
hydraulic pump plungers touching the movable swash plate;
hydraulic motor plungers;
timing spools;
a fixed swash plate arranged oppositely to the movable swash plate and touching the hydraulic motor plungers; and
an output member fixed to the fixed swash plate,
wherein the cylinder block includes hydraulic pump plunger holes, hydraulic motor plunger holes and timing spool holes so that the hydraulic pump plungers, the hydraulic motor plungers and the timing spools are inserted into the hydraulic puma plunger holes, the hydraulic motor plunger holes and the timing spool holes, respectively, so as to be slidable in the axial direction of the rotary axis of the input shaft and cylinder block, and
wherein when the cylinder block is viewed in the direction of the rotary axis of the input shaft and cylinder block, the hydraulic pump plunger holes, the hydraulic motor plunger holes and the timing spool holes are arranged in respective radial directions from the rotary axis of the input shaft and cylinder block so that:
the hydraulic pump plunger holes and the hydraulic motor plunger holes are arranged alternately on a first circle having a first radius centered on the rotary axis of the input shaft and cylinder block, the timing spool holes are arranged on a second circle having a second radius centered on the rotary axis of the input shaft and cylinder block, the second constant radius being smaller than the first constant radius, and the radial direction of each timing spool hole from the rotary axis of the input shaft and cylinder block is arranged between the radial directions of every adjoining the hydraulic pump plunger hole and hydraulic motor plunger hole.

7. The hydraulic apparatus as set forth in claim 6, wherein the cylinder block is formed by casting with cores so as to have the hydraulic pump plunger holes, the hydraulic motor plunger holes, the timing spool holes and an oil passage connected to the plunger holes.

8. The hydraulic apparatus as set forth in claim 1, further comprising:

an input shaft;

a cylinder block provided on the input shaft so as to have a common rotary axis with the input shaft;

hydraulic pump plungers housed in the cylinder block so as to be slidable in parallel to the rotary axis and so as to touch the movable swash plate;

hydraulic motor plungers housed in the cylinder block so as to be slidable in parallel to the rotary axis;

timing spools housed in the cylinder block so as to be slidable in parallel to the rotary axis;

a fixed swash plate arranged oppositely to the movable swath plate and touching the hydraulic motor plungers;

an output member fixed to the fixed swash plate; and a cylindrical cam having a groove into which tips of the timing spools are slidably fitted, wherein a surface of the groove touching the tips of the timing spools is curved.

9. The hydraulic apparatus as set forth in claim 8, wherein a surface of the tip of each timing spool touching the curved surface of the groove on the cylindrical cam is flat.

10. The hydraulic apparatus as set forth in claim 8, wherein:

the fixed swash plate has a cylindrical edge formed with first and second projections having respective flat surfaces that are parallel to each other, the cylindrical cam has a cylindrical edge formed with first and second recesses having respective flat surfaces that are parallel to each other, and the first and second projections are engaged into the first and second recesses, respectively, so that the fixed swash plate is fixed to the cylindrical cam so as not to be rotatable relatively to the cylindrical cam.

11. The hydraulic apparatus as set forth in claim 10, wherein:

a third projection having a flat surface that is not parallel to the flat surfaces of the first and second projections is formed on the cylindrical edge of the fixed swash plate, a third projection having a flat surface that is not parallel to the flat surfaces of the first and second recesses is formed on the cylindrical edge of the cylindrical cam, and the third projection is engaged into the third recess so that the fixed swash plate is fixed to the cylindrical cam so as not to be rotatable relatively to the cylindrical cam.

* * * * *